US008599132B2

(12) United States Patent
Chen et al.

(10) Patent No.: US 8,599,132 B2
(45) Date of Patent: Dec. 3, 2013

(54) METHODS AND SYSTEMS FOR CONTROLLING ELECTRONIC DEVICES ACCORDING TO SIGNALS FROM DIGITAL CAMERA AND SENSOR MODULES

(75) Inventors: Cheng-Che Chen, Taipei County (TW); Hsin-Te Shih, Taipei County (TW); Tsung-Ju Tsai, Yunlin County (TW)

(73) Assignee: Mediatek Inc., Hsin-Chu (TW)

( * ) Notice: Subject to any disclaimer, the term of this patent is extended or adjusted under 35 U.S.C. 154(b) by 1243 days.

(21) Appl. No.: 12/199,921

(22) Filed: Aug. 28, 2008

(65) Prior Publication Data

US 2009/0303176 A1    Dec. 10, 2009

Related U.S. Application Data

(60) Provisional application No. 61/060,149, filed on Jun. 10, 2008.

(51) Int. Cl.
*G06F 3/033* (2013.01)
*G09G 5/08* (2006.01)

(52) U.S. Cl.
USPC ............................ 345/158; 345/169; 715/863

(58) Field of Classification Search
USPC .................................. 345/158, 169; 715/863
See application file for complete search history.

(56) References Cited

U.S. PATENT DOCUMENTS

| 2002/0167488 | A1* | 11/2002 | Hinckley et al. | 345/156 |
| 2005/0233766 | A1* | 10/2005 | Futami | 455/556.1 |
| 2007/0041058 | A1 | 2/2007 | Disatnik et al. | |
| 2007/0283296 | A1 | 12/2007 | Nilsson | |
| 2008/0117299 | A1* | 5/2008 | Carter | 348/152 |
| 2008/0134102 | A1 | 6/2008 | Movold et al. | |
| 2008/0165022 | A1* | 7/2008 | Herz et al. | 340/669 |
| 2008/0246723 | A1* | 10/2008 | Baumbach | 345/156 |

* cited by examiner

*Primary Examiner* — Michael Pervan
(74) *Attorney, Agent, or Firm* — McClure, Qualey & Rodack, LLP

(57) ABSTRACT

An embodiment of a method for remotely controlling an electronic apparatus, performed by a processor of the electronic apparatus, comprises the following steps. Existence of an object in close proximity to the electronic apparatus is detected. A camera module of the electronic apparatus is turned on to capture a series of images. A control operation in response to the captured images is determined. The control operation is performed to an electronic device of the electronic apparatus.

19 Claims, 22 Drawing Sheets

METHODS AND SYSTEMS FOR CONTROLLING ELECTRONIC DEVICES ACCORDING TO SIGNALS FROM DIGITAL CAMERA AND SENSOR MODULES

CROSS REFERENCE TO RELATED APPLICATIONS

This application claims the benefit of U.S. Provisional Application No. 61/060,149 filed on Jun. 10, 2008.

BACKGROUND

The invention relates to a man-machine interface (MMI), and more particularly, to methods and systems for controlling electronic devices with a digital camera module and a sensor module.

The MMI is the means by which people interact with an electronic apparatus. The MMI comprises screen menus and icons, keyboard shortcuts, command language and online help, as well as physical buttons, dials and levers. The MMI also comprises input devices, such as a mouse, a keyboard, a touch screen, a joy stick, a game controller or a data glove. By using input devices of the MMI, users may manually touch, press, click, grasp or move the input devices to operate respective electronic apparatus. However, when a user is unable to manually manipulate the electronic apparatus or when the electronic apparatus is fixed in a specific position and can not be easily moved, operation thereof is hindered or prevented. As such, recently, microphones have been implemented and used as input devices of the MMI. Specifically, the microphones allow for voice control by processing human voice signals, determining speech patterns from natural language and voice recognition. Nonetheless, deficiencies exist when manual manipulation is prevented in an environment requiring no loud noises or no talking.

SUMMARY

An embodiment of a method for remotely controlling an electronic apparatus, performed by a processor of the electronic apparatus, comprises the following steps. Existence of an object in close proximity to the electronic apparatus is detected. A camera module of the electronic apparatus is turned on to capture a series of images. A control operation in response to the captured images is determined. The control operation is performed to an electronic device of the electronic apparatus.

An embodiment of a method for remotely controlling an electronic apparatus, performed by a processor of the electronic apparatus, comprises the following steps. A camera module of the electronic apparatus is turned on to capture a series of images when receiving a signal indicating that a particular event has been triggered. A control operation in response to the captured images is determined. The control operation is performed to an electronic device of the electronic apparatus.

An embodiment of an electronic apparatus comprises a camera module, a sensor module, an electronic device and a processor. The sensor module detects whether existence of an object in close proximity to the electronic apparatus. The processor, coupled to the camera module, the sensor module and the electronic device, turns on the camera module to capture a series of images when the sensor module detects existence of an object in close proximity to the electronic apparatus, receives the captured images from the camera module, determines a control operation in response to the captured images, and performs the control operation to the electronic device.

BRIEF DESCRIPTION OF THE DRAWINGS

The present invention can be more fully understood by reading the subsequent detailed description and examples with references made to the accompanying drawings, wherein.

DETAILED DESCRIPTION

Figure 1A:
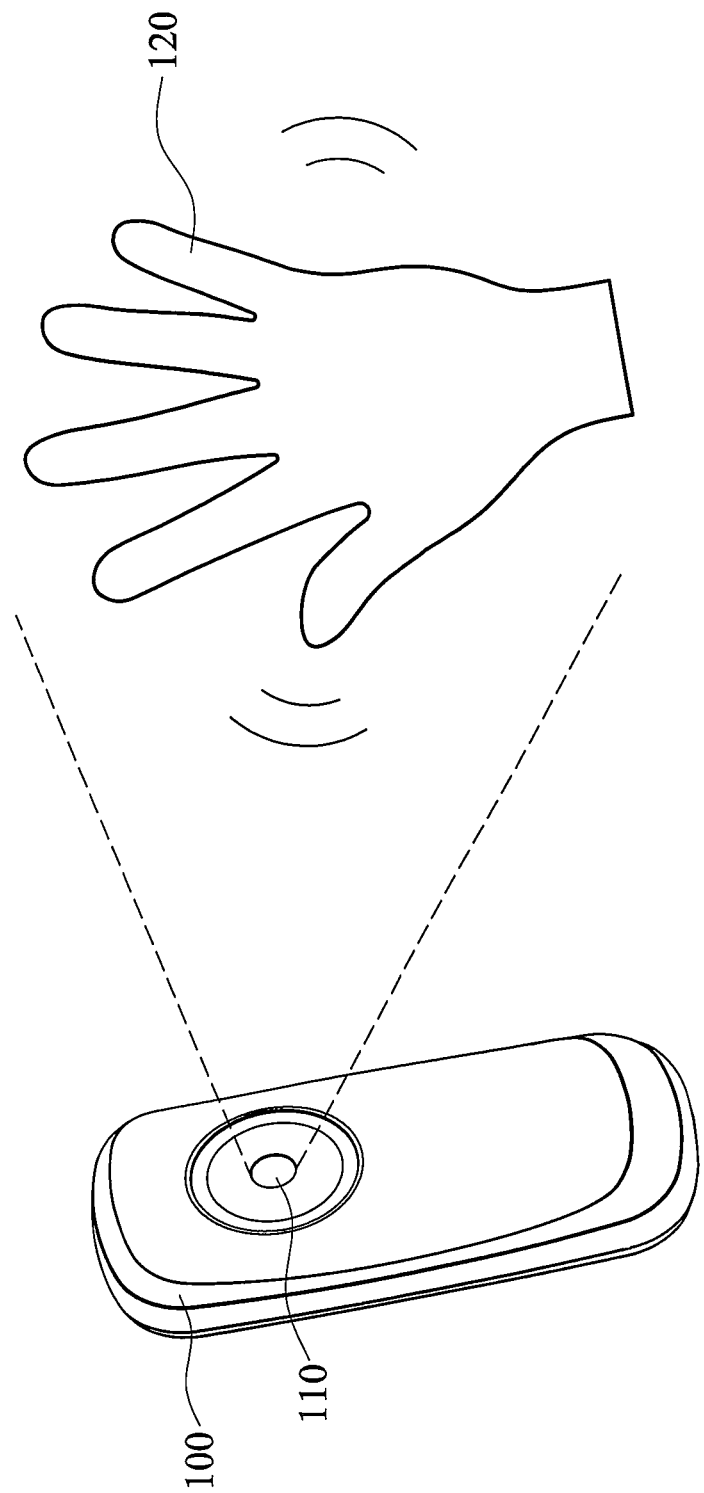
FIGS. 1A, 1B and 1E are schematic diagrams showing examples of a mobile phone being remotely controlled by a hand or a held pen without contact.
Figure 1B:
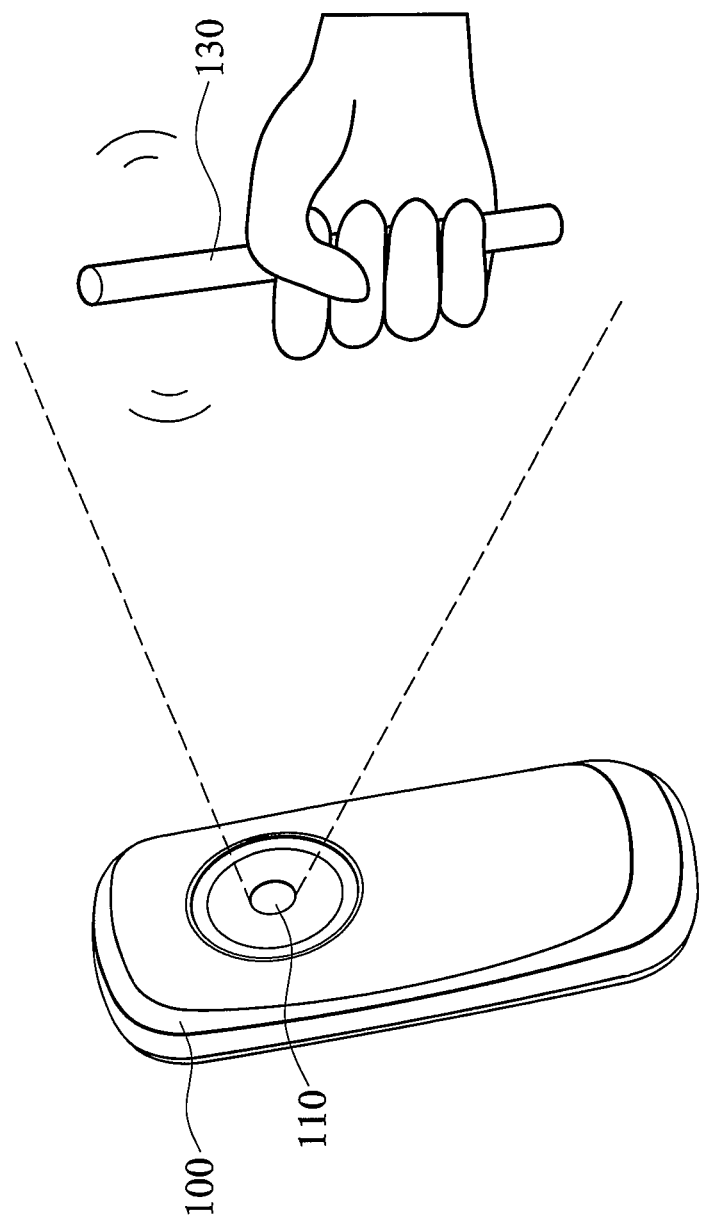

In order to address the aforementioned deficiencies of the conventional man-machine interface (MMI), a novel MMI comprising a sensor module and a digital camera module installed in an electronic apparatus is implemented as follows. When the sensor module detects that an object such as a hand, a pen or others, is close to the electronic apparatus, the digital camera module is activated to focus on the object and capture images of the focused object. A processor installed in the electronic apparatus analyzes the captured images and accordingly controls one or many electronic devices therein according to the analyzed captured images. FIGS. 1A and 1B are schematic diagrams showing examples of a mobile phone 100 being remotely controlled by a hand 120 or a held pen 130 without contact, via image capturing by an embedded camera module 110.

Figure 2:
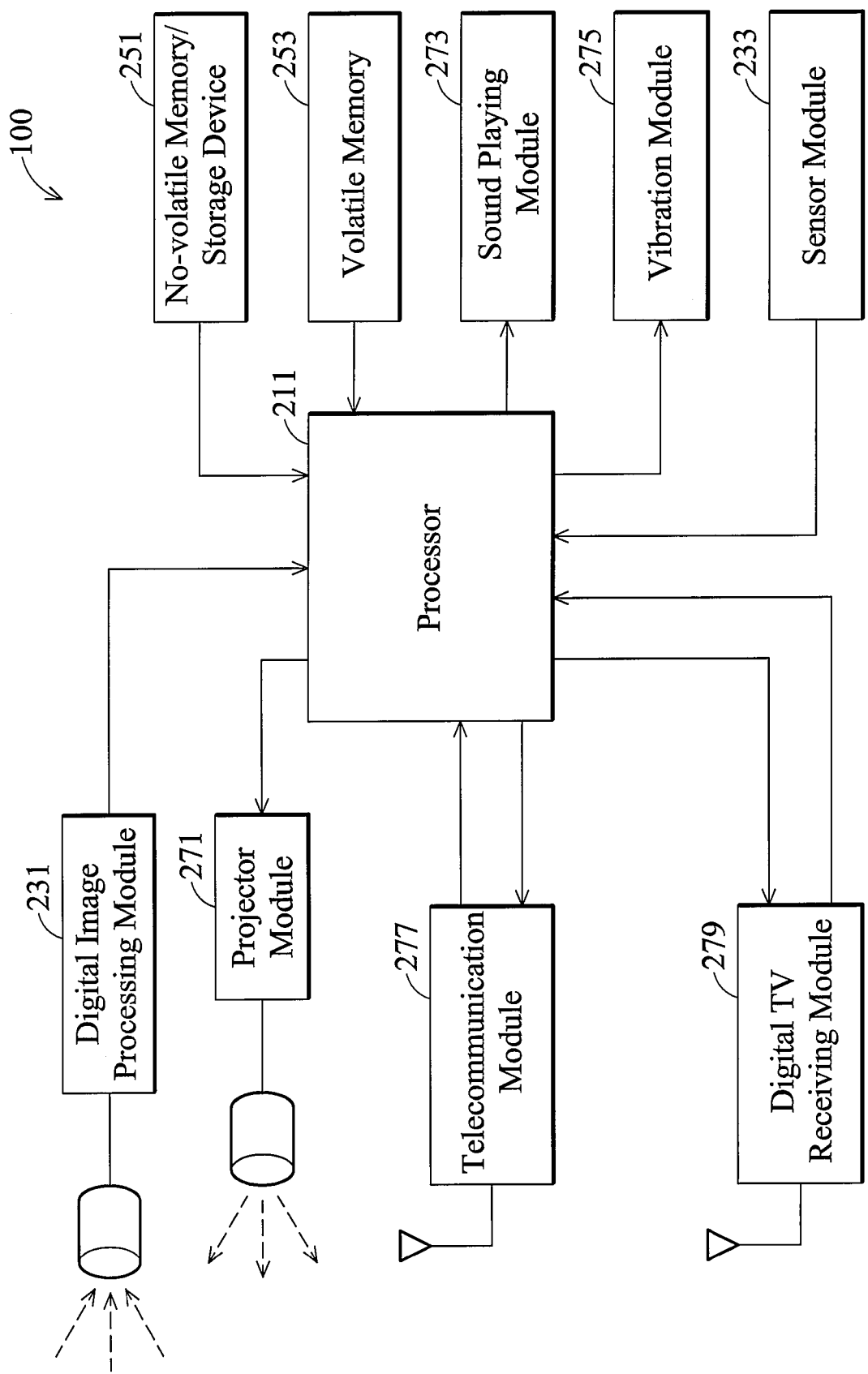
FIG. 2 is the hardware architecture of an embodiment of a mobile phone equipped with various electronic devices.

FIG. 2 is a hardware architecture of an embodiment of the mobile phone 100 equipped with various electronic devices such as a processor 211, a digital image processing module 231, a sensor module 233, a non-volatile storage/memory device 251, a volatile memory 253, a projector module 271, a sound playing module 273, a vibration module 275, a telecommunication module 277 and a digital TV receiving module 279. It is to be understood that, without departing from the scope and spirit of the invention, the introduced MMI can also be employed in personal digital assistants (PDAs), digital music players, portable media players, digital TV/video players, and digital cameras or others.

In a Global System for Mobile Communications (GSM) network, the mobile phone 100 equipped with the processor 211 and the telecommunication module 277 may operate in an idle mode and a dedicated mode. In an idle mode, the mobile phone 100 is powered off, or searches for or measures a Broadcast Control Channel (BCCH) with better signal quality from a base station provided by a specific network operator, or is synchronized to the BCCH of a specific base station and prepared to perform a random access procedure on the Random Access Channel (RACH) to request a dedicated channel. In a dedicated mode, the mobile phone 100 occupies a physical channel, attempts to synchronize therewith, and establishes logical channels which may be switched to and from.

Specifically, in an idle mode, the mobile phone 100 continuously listens to the BCCH from a base station via the telecommunication module 277. Additionally, the mobile phone 100 reads the BCCH information and conducts periodic signal strength measurements of the BCCH carriers in order to select a cell to be camped on. Meanwhile, the data required for Radio Resource Management (RR) and other signaling procedures are collected and stored, such as the list of neighboring BCCH carriers, thresholds for RR algorithms, Common Control Channel (CCCH) configurations, and information regarding the use of RACH and Paging channel (PCH), or others. Note that the collected and stored information is broadcasted by a base station system (BSS) on the BCCH (SYSTEM INFORMATION, SI, Types 1-4), and therefore is available to all mobile phones currently in the cell. The BSS further continuously sends a cell valid Layer 3 message (PAGING REQUEST) on all PCHs, whereby the MS can decode and recognize if its address (e.g. its IMSI of a specific SIM card) is paged (e.g. if a Mobile-Terminated MT call request to the mobile phone 100 is detected).

Note that each signaling message exchange with the network, e.g. BSS, Mobile Switching Center (MSC) and the similar, requires a Radio Resource Management (RR) connection and an LAPDm connection between the MS and the network. The RR connection may be initiated by the mobile phone 100 or network. After the RR connection has been successfully initiated, signaling messages may be received and transmitted by higher protocol layers, Connection Management (CM) and Mobility Management (MM). Additionally, the mobile phone 100 would either have a Stand-alone Dedicated Control Channel (SDCCH) or a Traffic Channel (TCH) with an appropriate Slow/Fast Associated Control Channel (SACCH/FACCH) for exclusive bidirectional use.

Initializing an MM connection from the mobile phone 100 requires the existence of an RR connection. Meanwhile a single RR connection may be used by multiple MM connections. If the MM connection is initiated, the mobile phone 100 can send a message CM-SERVICE REQUEST to the network. The message CM-SERVICE REQUEST contains information regarding the mobile subscriber (IMSI or TMSI), wherein the TMSI has only a local significance within a Location Area and must be used together for an LAI for the identification of a subscriber, as well as information regarding the requested services (e.g. outgoing voice call, short message service SMS transfer, and activation or registration of a supplementary service, or others).

In a Wideband Code Division Multiple Access (WCDMA) and a Time Division-Synchronous Code Division Multiple Access (TD-SCDMA) system, the mobile phone 100 equipped with the processor 211 and the telecommunication module 277 may be operated in an idle mode and a connected mode. In an idle mode, the mobile phone 100 continuously listens to Broadcast Control Channel (BCCH) via the telecommunication module 277 to acquire SYSTEM INFORMATION (SI) comprising a Public-Land-Mobile-Network (PLMN) code uniquely owned by a network operator. Specifically, the MS searches for a suitable cell of the chosen PLMN, chooses that cell to provide available services, and then tunes in to the chosen cell's control channel, also referred to as "camping on a cell". Once camped on a cell in an idle mode, the mobile phone 100 can receive system information and cell broadcast messages from a base station. The mobile phone 100 stays in an idle mode until the mobile phone 100 transmits a request to establish a Radio Resource Control (RRC) connection. In an idle mode, the mobile phone 100 is identified by non-access stratum identities such as IMSI, TMSI and P-TMSI.

In the Cell_DCH state of a connected mode, a dedicated physical channel is allocated to the mobile phone 100, and the mobile phone 100 is known by its serving radio network controller (RNC) on a cell or active set level. The mobile phone 100, with certain capabilities, monitors the Forward Access Channel (FACH) for system information messages. In the Cell_FACH state of a connected mode, no dedicated physical channel is allocated for the MS, but Random Access Channel (RACH) and FACH are allocated instead, for transmitting both signaling messages and small amounts of user plane data. In the Cell_FACH state, the mobile phone 100 also listens to the Broadcast Channel (BCH) to acquire system information. In the Cell_PCH state of a connected mode, while the mobile phone 100 is recognized on a cell level by a Serving Radio Network Controller (SRNC), the mobile phone 100 can only be contacted via the Paging Channel (PCH). Meanwhile, the URA_PCH state of a connected mode is very similar to the Cell_PCH state, except that the mobile phone 100 does not execute Cell Update after each cell reselection, but instead reads UMTS Terrestrial Radio Access Network (UTRAN) Registration Area (URA) identities from the BCH, and only if the URA changes (after cell reselection) the MS inform its location to the SRNC. Additionally, the mobile phone 100 leaves the connected mode and returns to the idle mode when the RRC connection is released or at RRC connection failure.

The establishment of an RRC connection and Signaling Radio Bearers (SRB) between a mobile phone 100 and a UTRAN (RNC) is initiated by a request from higher layers (non-access stratum) of the mobile phone. Additionally, the establishment is preceded by an RRC Paging message for a network-originated situation. The UTRAN (RNC) may respond with an RRC Connection Set-up message including a dedicated physical channel assignment for the mobile phone 100 (move to the Cell-FACH state), or a command to instruct the mobile phone 100 to use common channels (move to the Cell_FACH state).

In GSM, Call Control (CC) comprising procedures to establish, control, and terminate calls is one of the entities of the Connection Management (CM). When a call from the mobile phone 100 occurs (mobile-originated call), the CC entity first requests an MM connection from the local MM entity. For a simple call, the mobile phone 100 must be registered with the network, whereas, for an emergency call, the mobile phone 100 is optionally required to be registered with the network. Specifically, for non-registered mobile phones 100, the emergency call is established on an unenciphered RR connection. After successful establishment of this MM connection and activation of the user data encryption, the service-requesting CC entity is informed. The mobile phone 100 signals on this connection the desire to connect to the CC entity in the Mobile Switching Center MSC (SETUP). The MSC may respond to the connection request in several ways. First, the MSC may respond with a message CALL PROCEEDING to indicate that the call request has been accepted and that all the necessary information for the setup of the call is available. Second, the MSC may respond with a message RELEASE COMPLETE to indicate that the call request has been declined. Once a connection is made by a calling party (e.g. the corresponding node of a mobile phone or a wired telephone), the MS receives an ALERTING message; once the called party accepts the call, a CONNECT message is returned which acknowledges with a CONNECT ACKNOWLEDGE message, thus establishing the call and the associated user data connection. In addition, CC in GSM has a number of peculiarities, especially to account for the limited resources and properties of the radio channel. In particular, the call request of the mobile phone 100 may be entered into a queue (call queuing), if there is no immediately free TCH for the establishment of the call. The maximum waiting time a call may have to wait for assignment of a TCH may be set according to operator requirements. Furthermore, when the TCH is actually assigned can be chosen. For example, the traffic channel may be assigned immediately after acknowledging the call request (CALL PROCEEDING), also referred to as an early assignment. On the other hand, the call may be first processed and the assignment occurs only after the targeted subscriber is being called, also referred to as a late assignment or an Off-Air Call Setup (OACSU). The OACSU may avoid unnecessary allocation of a TCH if the called party is not available. On the other hand, there is the probability that after a successful call request signaling procedure, no TCH may be allocated for the calling party before the called party accepts the call, and thus the call cannot be completely switched through and have to be broken off. Note that the CC for a WCDMA or TD-SCDMA system is similar to that of a GSM system and is not described for brevity.

The projector module 271 (FIG. 2) acquires still images or a video sequence from the non-volatile memory/storage device 251 (FIG. 2) or volatile memory device 253 (FIG. 2), and projects the corresponding images on a flat surface, wall or others using a lens system. The video projector module 271 may contain a liquid crystal on silicon (LCOS) unit or a Digital Light Processing (DLP) unit to emit very bright lights, measured in lumens, abbreviated "lm", to project still images, video films, TV programs or others.

If equipped with a digital TV receiving module 279 and a projector module 271, the mobile phone 100 may be considered as a digital TV player. The mobile phone 100 may receive and process DVB-T (Digital Video Broadcasting-Terrestrial), DVB-H (Digital Video Broadcasting-Handheld) or similar video signals with the digital TV receiving module 279 and the processor 211 thereof.

A DVB-T system transmits an MPEG audio/video stream, using OFDM (Orthogonal frequency-division multiplexing) modulation with concatenated channel coding (i.e. COFDM). Video, audio and data streams are multiplexed into an MPEG PS (MPEG Program Stream), and one or more PSs are joined together into an MPEG TS (MPEG Transport Stream). The MPEG PS may be an MPEG-1, MPEG-2, MPEG-4, H.263 or H.264 or similar stream. The MEPG TS is the basic digital stream which is transmitted and received by the digital TV receiving module 279. Note that two different TSs may be transmitted at the same time, using a technique called hierarchical transmission. Hierarchical transmission may be used, for example, to transmit a standard definition SDTV signal and a high definition HDTV signal on the same carrier. Depending on the quality of the received signal, the digital TV receiving module 279 can selectively decode the HDTV and SDTV streams. The MPEG TS is represented as a sequence of fixed length data packets (e.g. 188 bytes). DVB-H (Digital Video Broadcasting-Handheld) is a technical specification for bringing broadcast services to handheld receivers. The DVB-H uses a power-saving algorithm based on the time-multiplexed transmission of different services (e.g. TV programs). Time slicing performed by a time slicing module of a transmitter saves a great amount of battery power. For DVB-H, service multiplexing is performed in a pure time-division multiplex manner. The data of one particular service is therefore not transmitted continuously but in compact periodical bursts with interruptions in between. Additionally, time slicing allows soft handover if the mobile phone 100 moves from one network cell to another with only one receiving unit. DVB-H, unlike the DVB-T (Digital Video Broadcasting-Terrestrial) system, is IP (Internet Protocol) based. The DVB-H baseband interface is an IP interface, which allows the DVB-H system to be easily integrated with other IP-based networks.

Figure 1C:
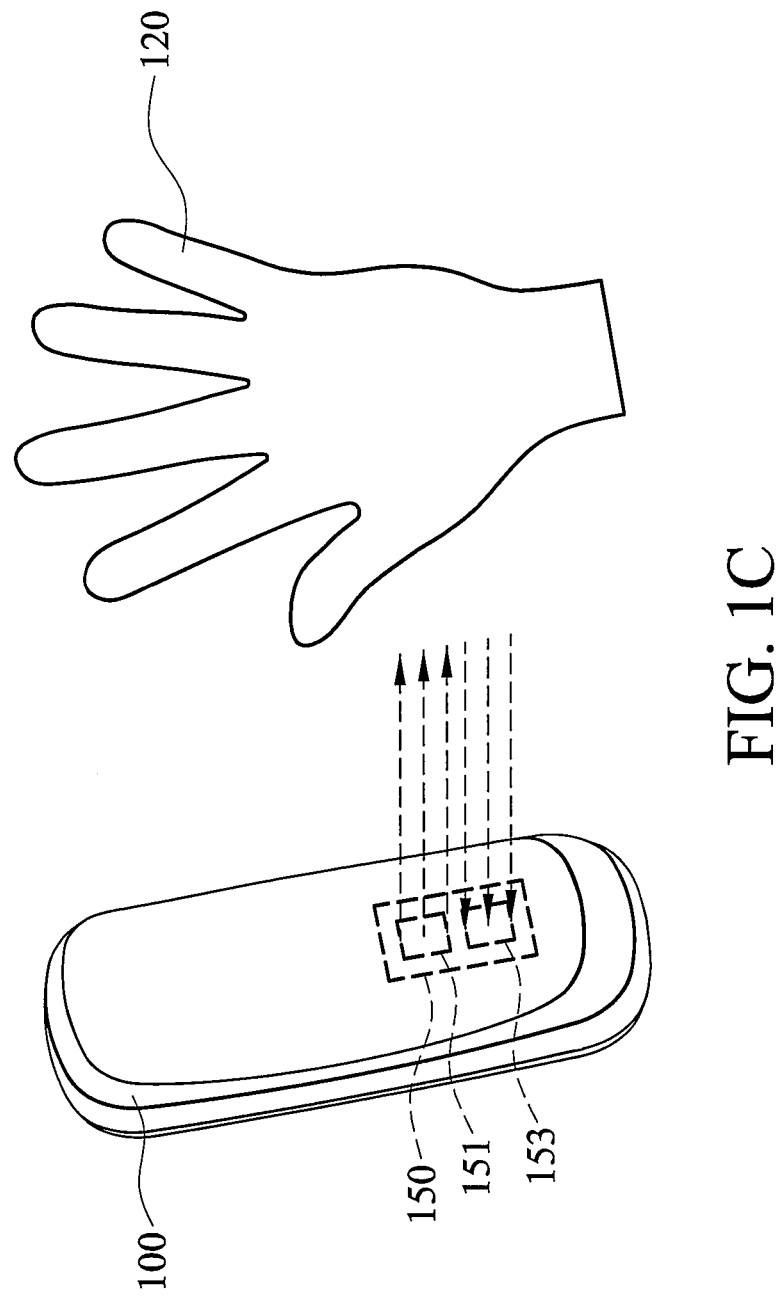
FIG. 1C is a schematic diagram of an embedded light sensor detecting that a hand is close to a mobile phone.
Figure 1D:
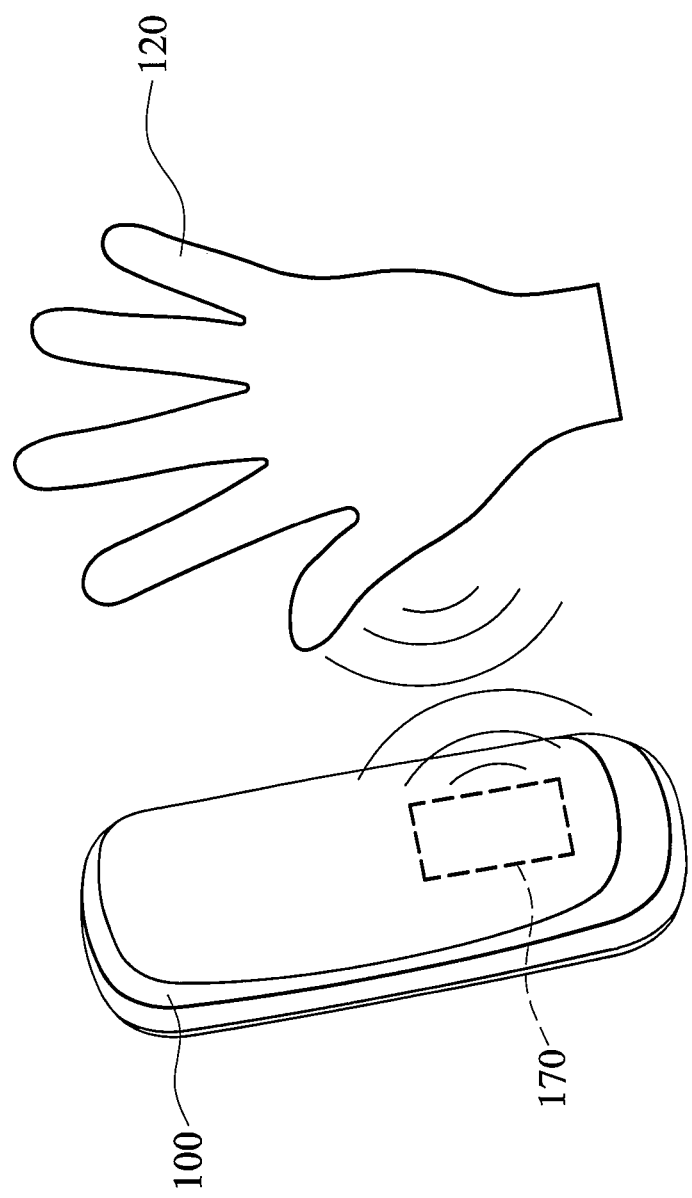
FIG. 1D is a schematic diagram of an embedded capacitive sensor detecting that a hand is close to a mobile phone.

The sensor module 233 may be a proximity detector, a capacitive sensor or others, detecting existence of an object which is close to the mobile phone 100. FIG. 1C is a schematic diagram of an embedded light sensor 150 detecting that a hand 120 is close to the mobile phone 100. The embedded light sensor 150 comprises a transmitter 151 emitting infrared signals, a receiver 153 receiving the infrared signals reflected by the hand 120 and a control unit (not shown) generating a signal indicating that an object is close to the mobile phone 100 when detecting a certain amount of the reflected infrared signals via the receiver 153. FIG. 1D is a schematic diagram of an embedded capacitive sensor 170 detecting that the hand 120 is close to the mobile phone 100. For a human body is a capacitor (body capacitance), the capacitance of the embedded capacitive sensor 170 is typically increased when a hand is nearby. The embedded capacitive sensor 170 detects capacitance between itself and a nearby human body and generates a signal indicating that a hand is close to the mobile phone 100 when detecting changes in an electric field satisfy one or more predefined criterion.

Figure 3:
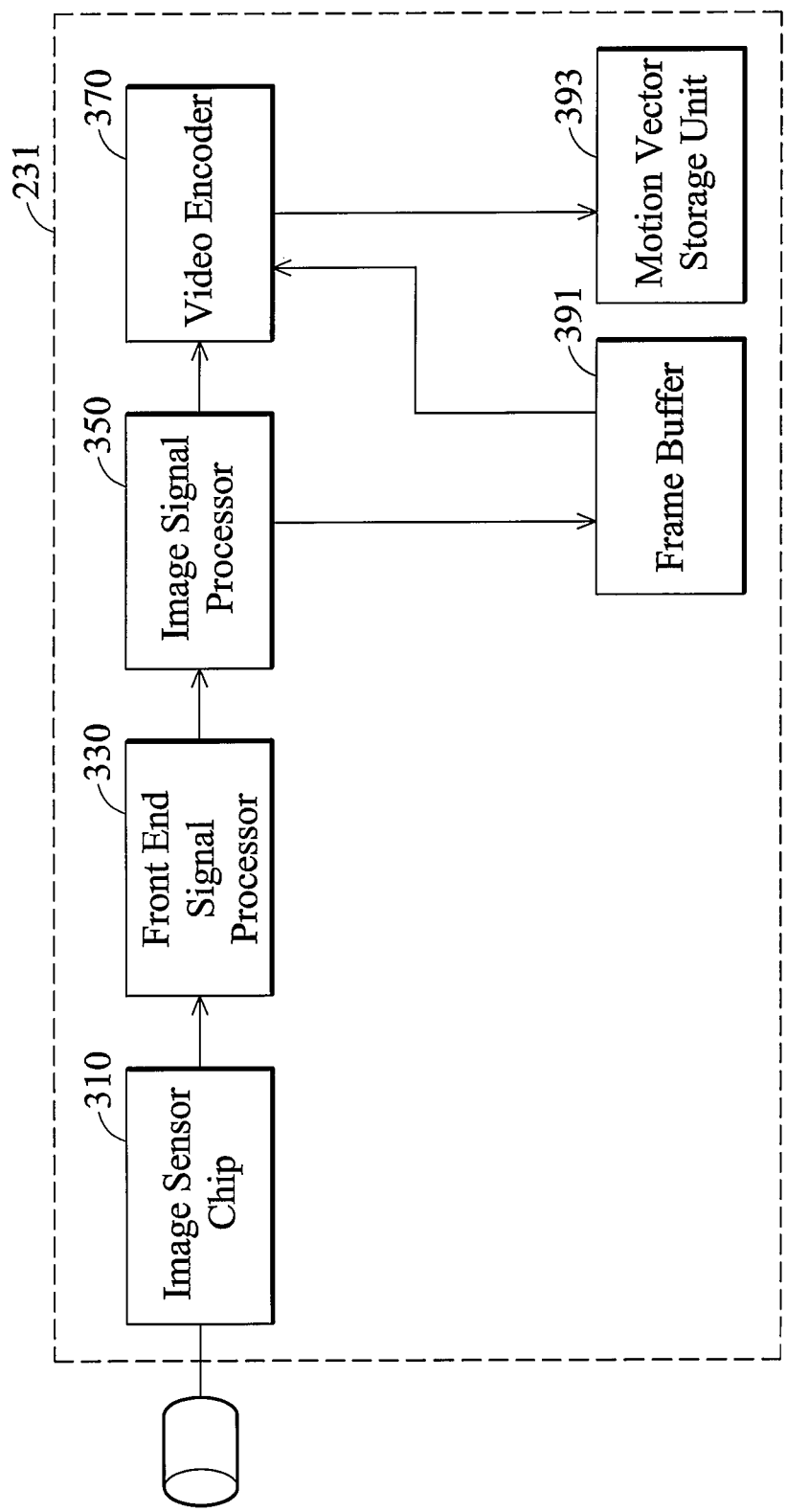
FIG. 3 is a diagram of a hardware environment applicable to an embodiment of a digital image processing module.

The digital image processing module 231 of FIG. 2 is implemented to capture an object in front of the camera module 110 (FIG. 1A or 1B). FIG. 3 is a diagram of a hardware environment applicable to an embodiment of the digital image processing module 231 (FIG. 2) comprising an image sensor chip 310, a front end signal processor 330, an image signal processor 350, a video encoder 370, a frame buffer 391 and a motion vector storage unit 393. The digital image processing module 231 records color images as intensities of red, green and blue light, which are stored as variable charges on the image sensor chip 310 such as a complementary metal-oxide semiconductor (CMOS) or a charge-coupled device (CCD) image sensor chip. The charges, which are actually analog, are converted to digital signals by the front end signal processor 330 for subsequent processing. The image signal processor 350 generates an original Bayer pattern image based on the converted digital signals. Each pixel of a Bayer pattern contains information that is relative to only one color component, such as G, B or R. A color interpolation unit installed in the image signal processor 350 may interpolate the Bayer pattern image to get a complete color image, RGB bitmap image. The RGB bitmap image may record an object such as a hand, a pen or others. Each pixel of the resulting RGB bitmap image contains information that is relative to three color components, such as G, B and R. The RGB bitmap image may be further processed by a gamma correction unit installed in the image signal processor 350 to perform a gamma correction process therewith and to generate a corrected RGB bitmap image, which may further be transformed into an YCbCr bitmap image by an RGB to YCbCr transform unit installed in the image signal processor 350. The RGB or YCbCr bitmap images may be stored in the frame buffer 391 for subsequent analysis. It is to be understood that the frame buffer 391 may be implemented in either the non-volatile memory/storage device 251 (FIG. 2) or volatile memory 253 (FIG. 2). Note that in some embodiments, only R or Y components of each RGB or YCbCr bitmap image are stored to increase performance analysis and reduce storage capacity. Certain features may be extracted from one or more full or reduced RGB or YCbCr bitmap images, and are analyzed to detect whether existence of a particular gesture has been captured.

The video encoder 370 receives a series of captured YCbCr bitmap images, also referred to as still images, from either the image signal processor 350 or the frame buffer 391 and performs relevant encoding procedures. The captured YCbCr bitmap images contain temporal redundancies. Temporal redundancy refers to identical temporal motion between YCbCr bitmap images. The video encoder 370 relies on prediction, more precisely, motion-compensated prediction, for temporal compression between YCbCr bitmap images. Such temporal compression may be utilized to track a movement of an object in front of the camera module 110 (FIG. 1A or 1B). To create temporal compression, the video encoder 370 utilizes I-images (Intra-coded images), B-images (bidirectionally predictive-coded images) and P-images (predictive-coded images). An I-image is an intra-coded image, a single image heading a sequence, with no reference to previous or subsequent images. P-images are forward-predicted images, encoded with reference to one or more previous I- or P-image, with motion vectors pointing to information in one or more previous image. B-images are encoded with reference to one or more previous reference image, and one or more subsequent reference image. Motion vectors employed may be forward or backward vectors, or both and are recorded in the motion vector storage unit 393. It is to be understood that the motion vector storage unit 393 may be implemented in the non-volatile memory/storage device 251 (FIG. 2) or volatile memory 253 (FIG. 2).

Figure 4:
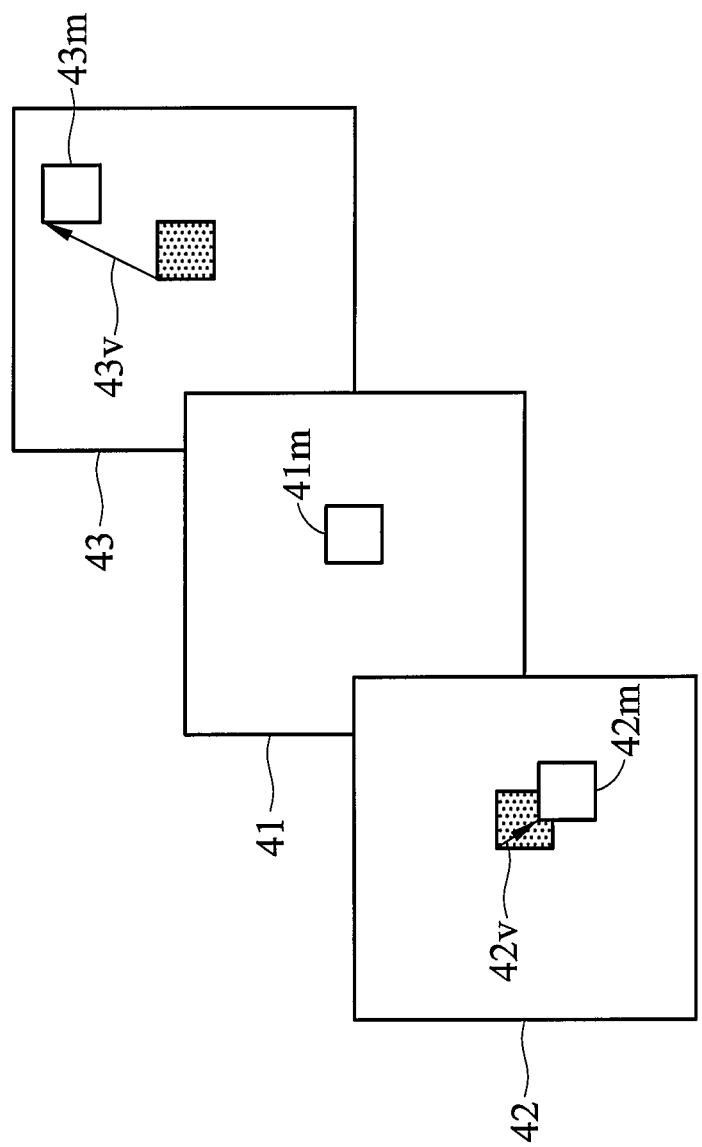
FIG. 4 is an exemplary diagram of a bidirectional prediction.

In a sequence of YCbCr bitmap images, the current image is predicted from a previous image known as reference image. Each macroblock (MB) is compared to an MB in the reference image by using an error measurement, and the best matching MB is selected. The search is conducted over a predetermined search area. A motion vector denoting the displacement of the MB in the reference image with respect to the MB in the current image, is determined. When a previous image is used as a reference, the prediction is referred to as a forward prediction. If the reference image is a future image, the prediction is referred to as a backward prediction. Backward prediction is typically used with forward prediction, and is referred to as bidirectional prediction. FIG. 4 is an exemplary diagram of a bidirectional prediction. In a B-image 41, the bi-directional motion-compensated MB 41*m* can have two motion vectors, the forward motion vector 42*v* which references the best matching block 42*m* in the previous I- or P-image 42, and the backward motion vector 43*v* which references the best matching block 43*m* in the next I- or P-image 43. A global motion estimation method may be employed to model the major part of the motion found in the sequence with an overall direction of movement. Thus, a movement of the object in front of the camera module 110 (FIG. 1A or 1B), such as a leftward, rightward, upward, downward, upper-leftward, upper-rightward, lower-leftward or lower-rightward movement or other directions, is tracked using the motion vectors acquired from a sequence of YCbCr bitmap images.

Figure 5:
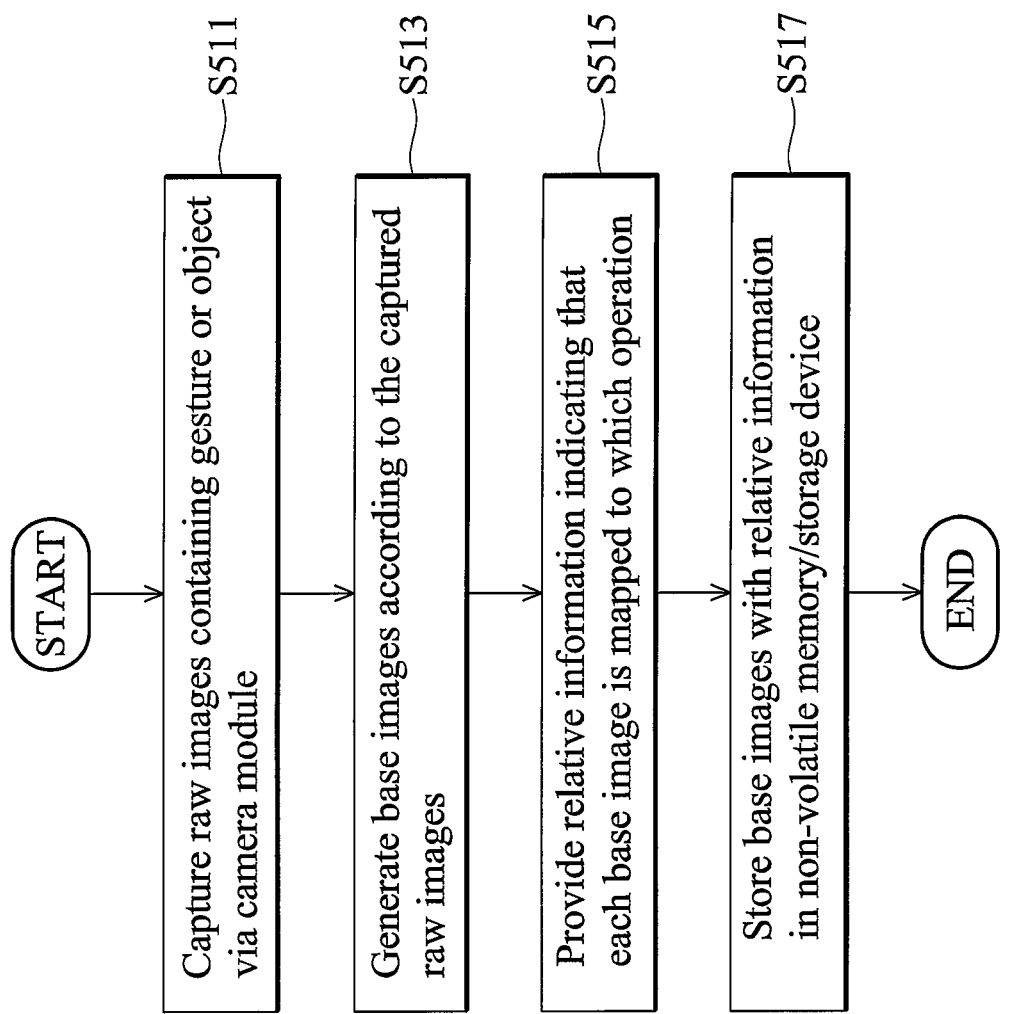
FIG. 5 is a flowchart illustrating an embodiment of a method for generating base images.
Figure 6:
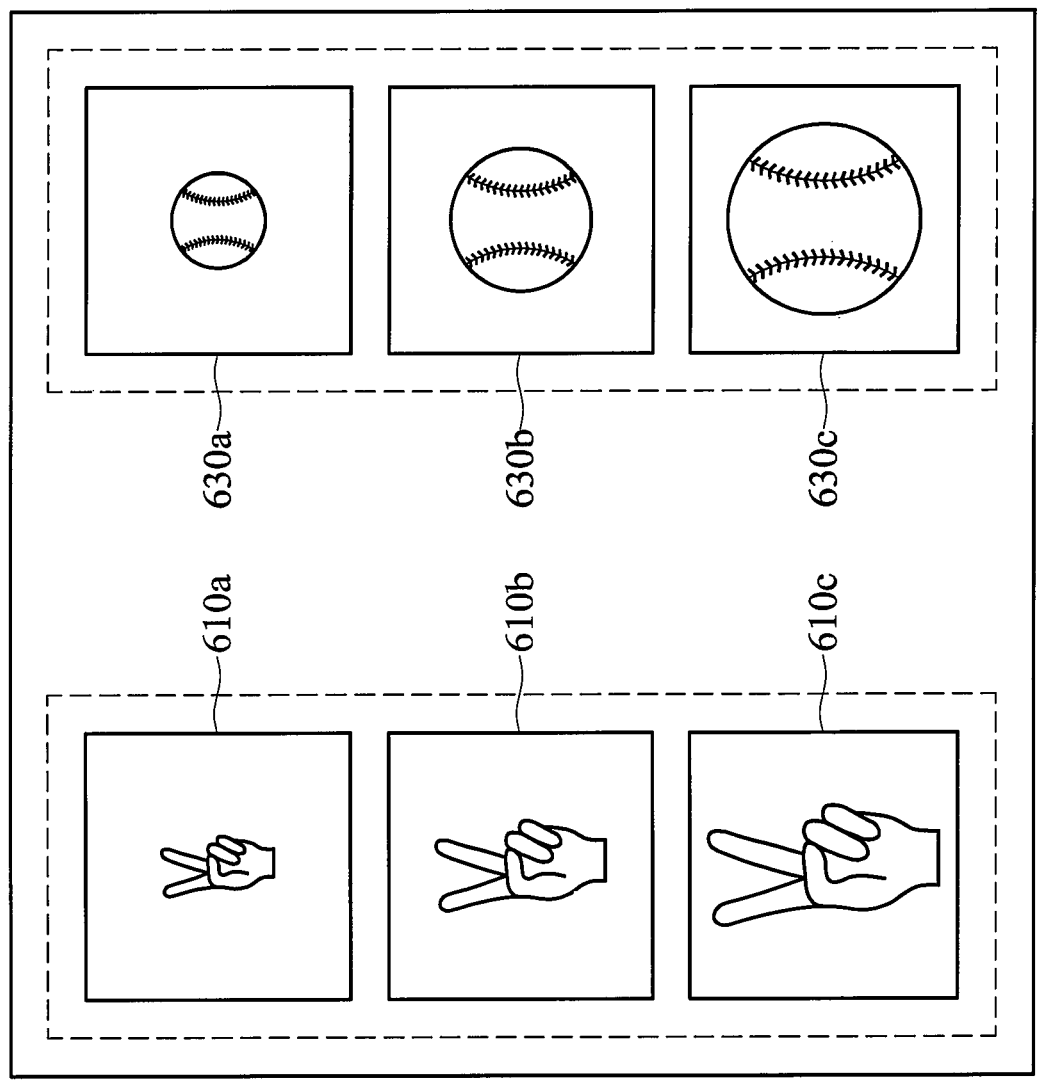
FIG. 6 is a diagram showing multiple exemplary raw images captured with different focal lengths.
Figure 7:
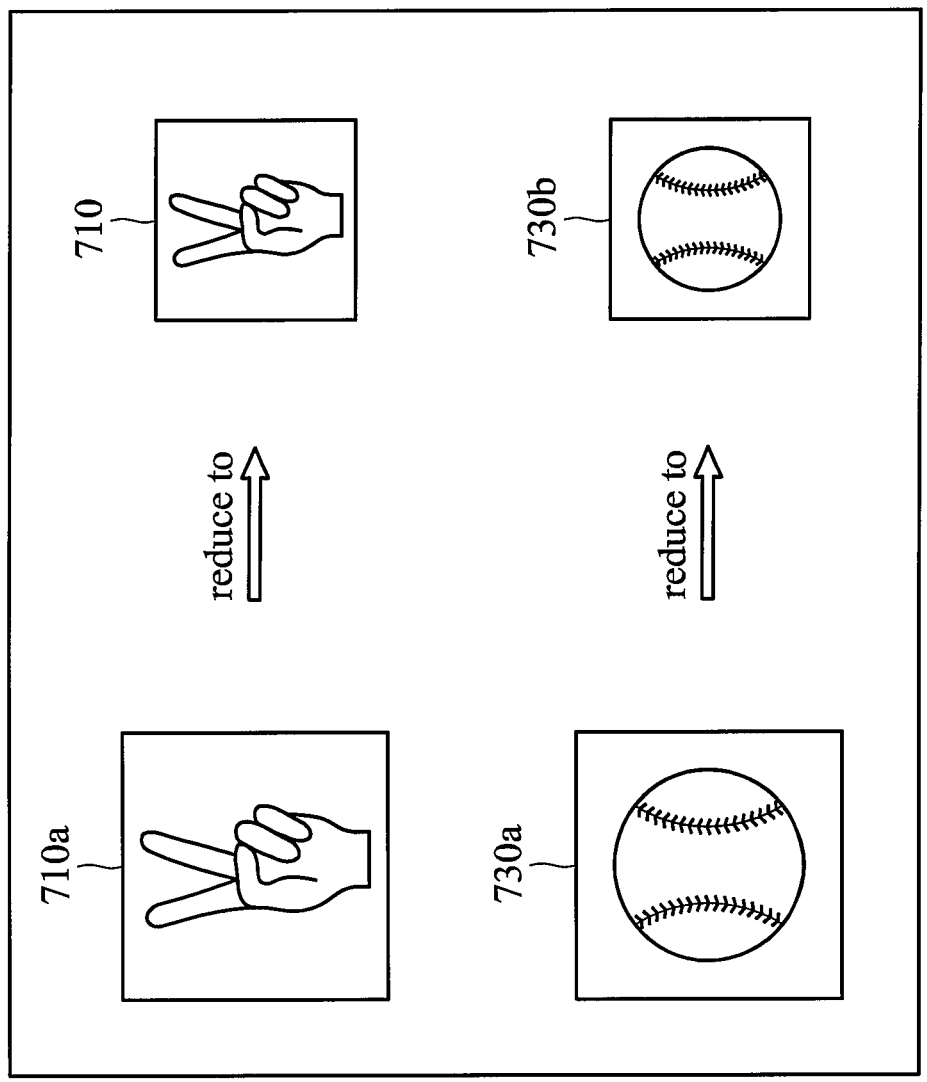
FIG. 7 is a diagram showing reduction of exemplary raw images.
Figure 8B:
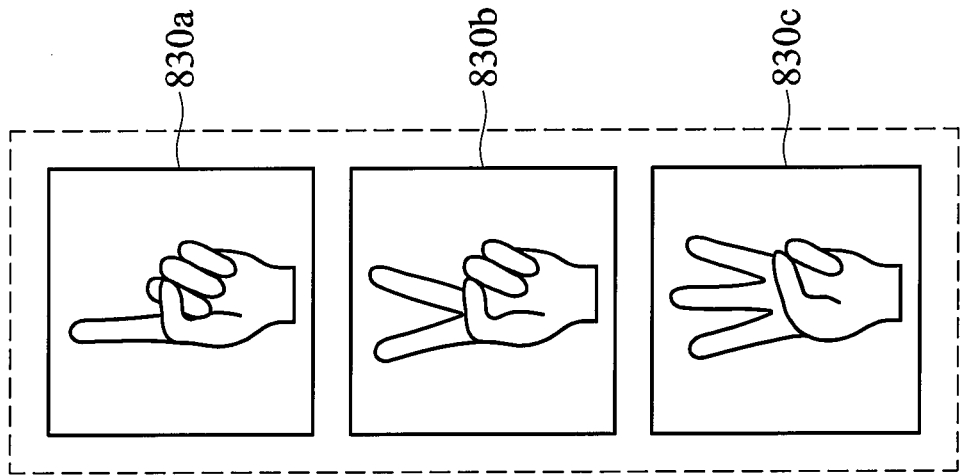
FIG. 8B is a diagram showing images containing gestures indicating number one to three.
Figure 8A:
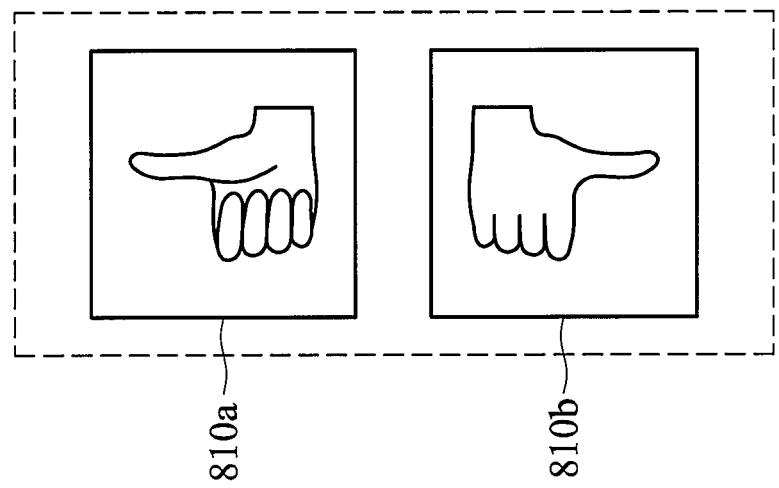
FIG. 8A is a diagram showing images containing gestures indicating to move-up and move-down.

For remote control with the aid of embedded camera modules, electronic apparatuses such as mobile phones, digital cameras, digital TV players, personal digital assistants (PDAs) containing digital camera modules, and the like, may prepare base images each comprising a specific gesture or an object and mapped to a specific operation, and then, trigger one of the mapped operations according to at least one captured image containing a gesture or an object similar to one base image, by the camera modules. Methods for generating base images mapped to operations are provided in the following. FIG. 5 is a flowchart illustrating an embodiment of a method for generating base images. To begin, at least one raw image containing a gesture or an object is captured by an embedded camera module (e.g. 110 of FIG. 1A or 1B) (step S511). A user may hold the electronic apparatus to set the embedded camera module to focus on his/her hand with a gesture, or an object, and press a shutter button disposed on a surface thereof to capture one or more raw images. Referring to FIG. 6, in order to improve comparative accuracy, the camera module may capture multiple raw images with different focal lengths 610*a* to 610*c* and 630*a* to 630*c*. A focal length, typically denoted as f' in formulas, is measured by the distance of the focal point (the point where the image of a parallel entering bundle of light rays is formed) from the lens of the camera module, or more exactly by the distance from the principal point to the focal point. Base images are generated according to the captured raw images (step S513). In an example, the captured raw images are considered as base images. In another example, referring to FIG. 7, in order to reduce the storage space, the captured raw images 710*a* and 730*a* may be reduced to relatively smaller-sized images 710*b* and 730*b*, for example, from 1024×768 to 640×480 pixels. In still another example, in order to reduce the storage space and improve comparative efficiency, only Y or G components of the raw images are acquired to generate base images. Subsequently, a base image is linked to one or more operation by building relative information (step S515). For example, referring to FIG. 8A, an image 810*a* containing a thumb-up gesture indicating move-up is mapped to acceptance of a request, such as an incoming call request from a base station, a request for replaying an audio/video file, or others, while an image 810*b* containing a thumb-down gesture indicating move-down is mapped to rejection of the request. Referring to FIG. 8B, images 830*a* to 830*c* containing gestures indicating number one to three are mapped to trigger a first, second and third operation, respectively. The relative information may be determined and set by a user via an MMI such as a keypad or touch screen. The base images with relative information are stored in a non-volatile memory/storage device (e.g. 251 of FIG. 2) (step S517).

Figure 8D:
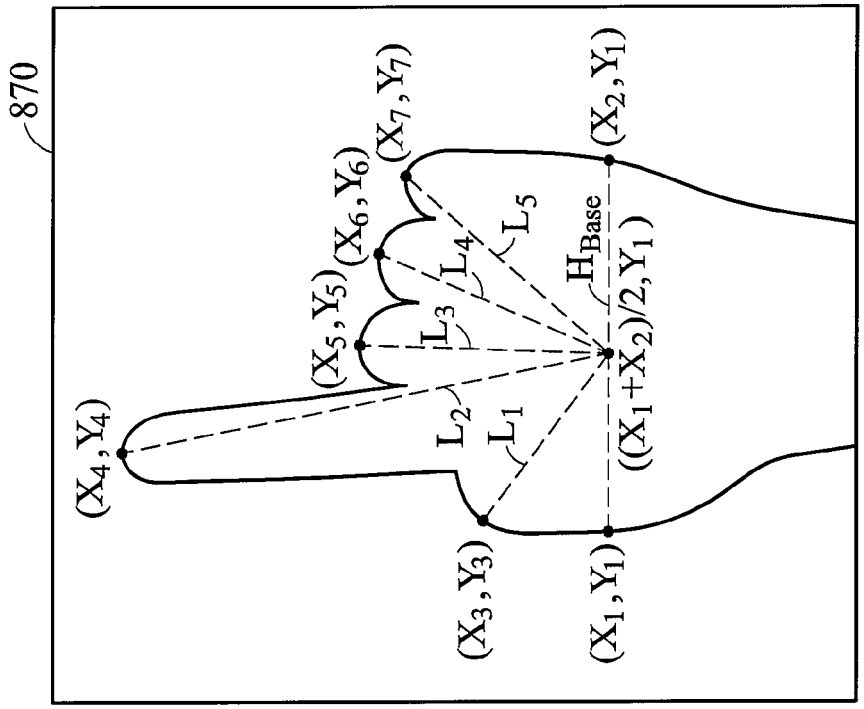
FIGS. 8C and 8D are diagrams illustrating exemplary feature extraction and discrimination function generation for captured images.
Figure 8C:
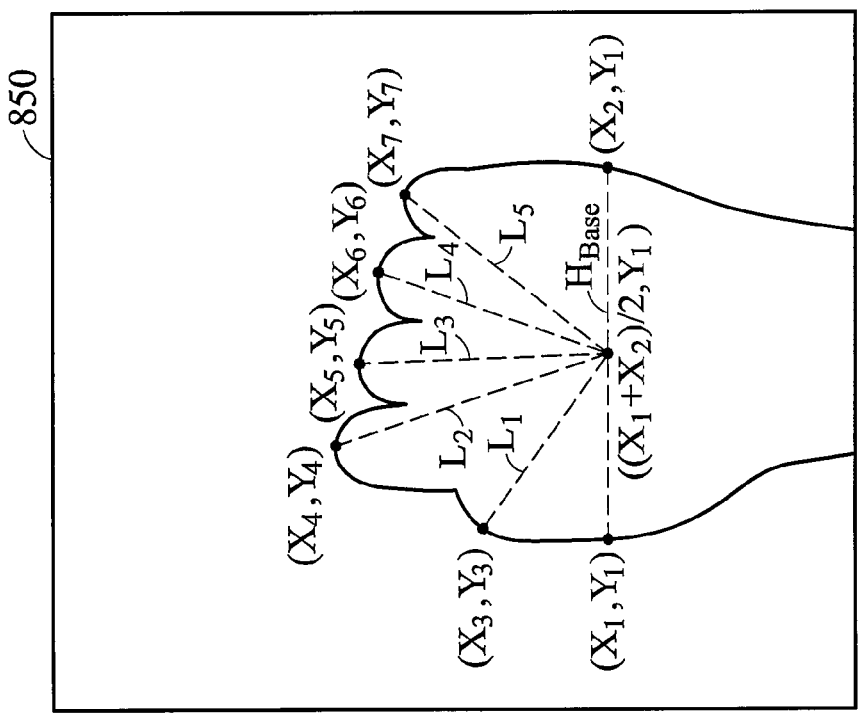

It is to be understood that a feature extraction procedure contains using predefined characteristic parameters to separate determined hand regions by similarity or dissimilarity. Accordingly, step S513 may be revised to determine a region of human flesh colors from each captured image and generate a discrimination function for the region of human flesh colors using the predefined feature extraction procedure. In addition, step S515 may be revised to provide relative information indicating that each generated discrimination function is mapped to a specific operation, with well as, step S517 may be modified to store the generated discrimination functions with the provided relative information. FIGS. 8C and 8D are diagrams illustrating exemplary feature extraction and discrimination function generation for captured images. Before feature extraction, the region of human flesh colors may be skew and thus may require to be adjusted by any well-known image correction algorithm. During an exemplary feature extraction and discrimination function generation, the region is scanned row by row to obtain a row with the maximum length, such as line $H_{Base}$ with two ends $(x_1,y_1)$ and $(x_2, y_1)$ and a center point thereof $((x_1+X_2)/2, y_1)$. The edge of the region is subsequently traced and at most five turning points for fingers being higher than the row of $H_{Base}$ are obtained, such as $(x_3,y_3)$, $(x_4,y_4)$, $(x_5,y_5)$, $(x_6,y_6)$ and $(x_7,y_7)$. Five lengths each representing a distance between one turning point and the center point are calculated, such as $L_1, L_2, L_3, L_4$ and $L_5$, the minimum length of the lengths denoted as $L_{MIN}$ is obtained and five relative lengths are calculated by $L_1/L_{MIN}$, $L_2/L_{MIN}$, $L_3/L_{MIN}$, $L_4/L_{MIN}$ and $L_5/L_{MIN}$. Suppose five relative lengths of image 850 are 1, 1.23, 1.22, 1.21 and 1.24 and five relative lengths of image 870 are 1, 2.3, 1.22, 1.23 and 1.24. Two discrimination functions for images 850 and 870 are described as $S_{SIM1}=(L_1'-1)^2+(L_2'-1.23)^2+(L_3'-1.22)^2+(L_4'-1.21)^2+(L_5'-1.24)^2$; and $S_{SIM2}=(L_1'-1)^2+(L_2'-2.3)^2+(L_3'-1.22)^2+(L_4'-1.23)^2+(L_5'-1.24)^2$, where $S_{SIM1}$ represents the similarity extent between the image 850 and a future image, $S_{SIM2}$ represents the similarity extent between the image 870 and the future image and $L_1'$ to $L_5'$ are values to be extracted in the future image. It is to be understood that a smaller value indicates a greater similarity extent.

Figure 9:
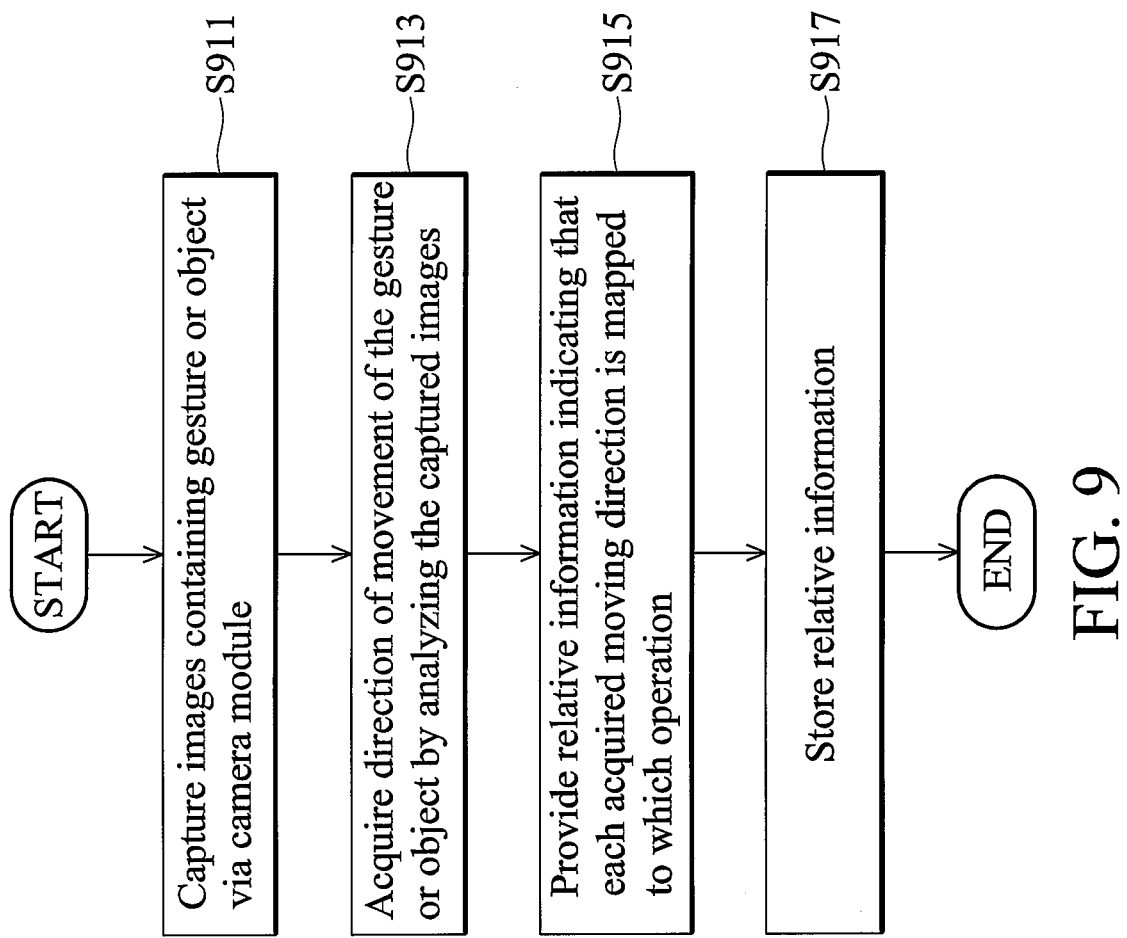
FIG. 9 is a flowchart illustrating an embodiment of a method for determining direction of movement.

In addition, electronic apparatuses may predefine the direction of movement each mapped to a specific operation, and then, trigger one of the mapped operations according to captured images containing a gesture or object moving to a predefined direction. Methods for determining direction of movement mapped to operations are provided. FIG. 9 is a flowchart illustrating an embodiment of a method for determining direction of movement. To begin, images containing a gesture or object are captured via an embedded camera module (e.g. 110 of FIG. 1A or 1B) (step S911). A user may hold the electronic device to set the embedded camera module to focus on his/her hand with a gesture, or an object, and press a shutter button disposed on a surface thereof to capture one or more raw images (e.g. track the movement of the hand or object). A direction of movement of the gesture or object is acquired by analyzing the captured images (step S913). In order to improve analytical efficiency, the captured images may be reduced to relatively smaller-sized images, for example, from 1024×768 to 640×480 pixels, or only Y or G components of the captured images may be acquired for calculation. A video encoder (e.g. 370 of FIG. 3) may receive the captured images, calculate motion vectors for the captured images (e.g. FIG. 4) and determine an overall direction of movement based on the generated motion vectors. For an example, an overall motion vector in response to the motion vectors, denoted as $(X_o,Y_o)$, is calculated by $$X_o = \left(\sum_{i=1}^{n} Xi\right)/n$$

and $$Y_o = \left(\sum_{i=1}^{n} Yi\right)/n$$

and the overall direction of movement is obtained accordingly, where n represents a total number of motion vectors, $X_i$ represents the reference offset in the X axis of the (i)th motion vector, and $Y_i$ represents the reference offset in the Y axis of the (i)th motion vector. In another example, each motion vector may be classified into predetermined movement directions (e.g. moving leftward, rightward, upward, downward, upper-leftward, upper-rightward, lower-leftward or lower-rightward or other directions) and each movement direction is counted according to the classification results. And then, it is determined whether the maximum count of one direction is higher than the others and satisfies a predetermined criterion, e.g. every $(n_{max}-n_i)$ exceeds a predetermined threshold, or every $(n_{max}/n_i)$ exceeding a predetermined threshold, for i=1 to a total number of the other counts, where $n_{max}$ represents the maximum count, and $n_i$ represents the count of one direction of the movement. If the predetermined criterion is satisfied, the movement direction with the maximum count is determined. Subsequently, relative information is provided, indicating mapping of the acquired direction of movement to a specific operation (step S915). For an example, a movement indicating move-up is mapped to acceptance of a request, such as an incoming call request from a base station, a request for replaying an audio/video file, or others, while a movement indicating move-down is mapped to rejection of the request. For another example, a movement to one direction is mapped to trigger one of predefined operations such as turning off a speaker to stop playing ring tones, turning on a vibrator function, start/stop of playback, displaying the previous/next photo, playing the previous/next multimedia file or others. The relative information may be determined and set by a user via an MMI such as a keypad or touch screen. The provided relative information is stored in a non-volatile memory/storage device (e.g. 251 of FIG. 2) (step S917). It is to be understood that steps S911 and S913 may be omitted and an MMI is provided in step S915 to facilitate creation of mappings between pre-set directions of movement and operations.

Figure 10:
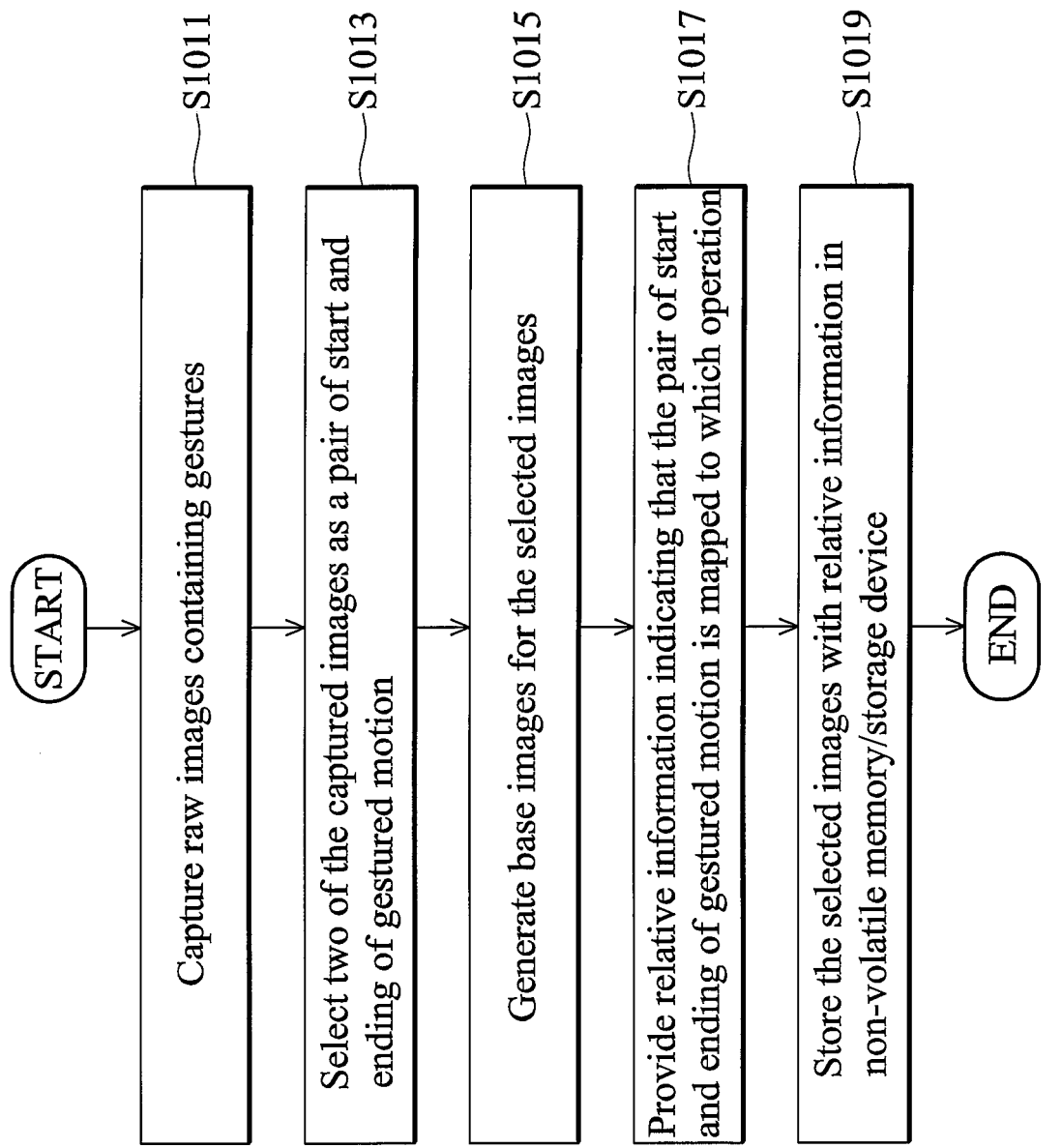
FIG. 10 is a flowchart illustrating an embodiment of a method for generating base images.
Figure 11B:
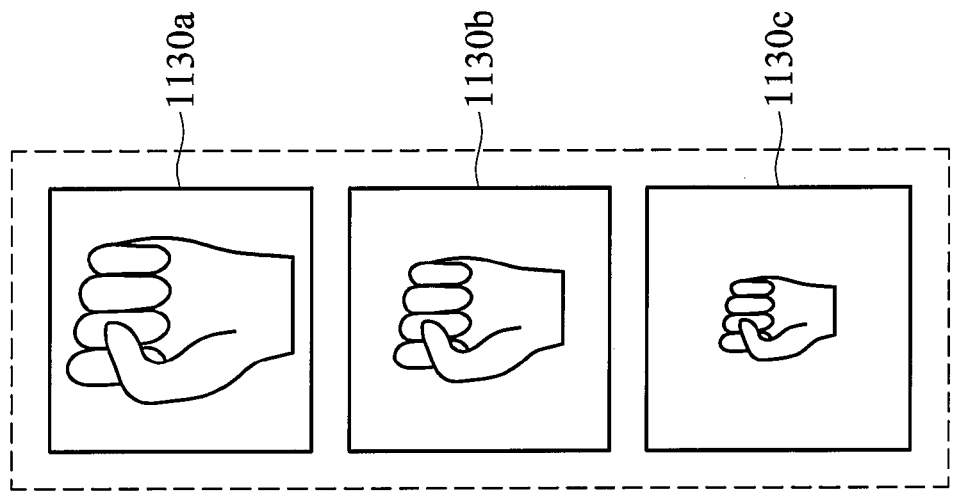
FIGS. 11A and 11B are diagrams showing multiple exemplary raw images captured with different focal lengths.
Figure 11A:
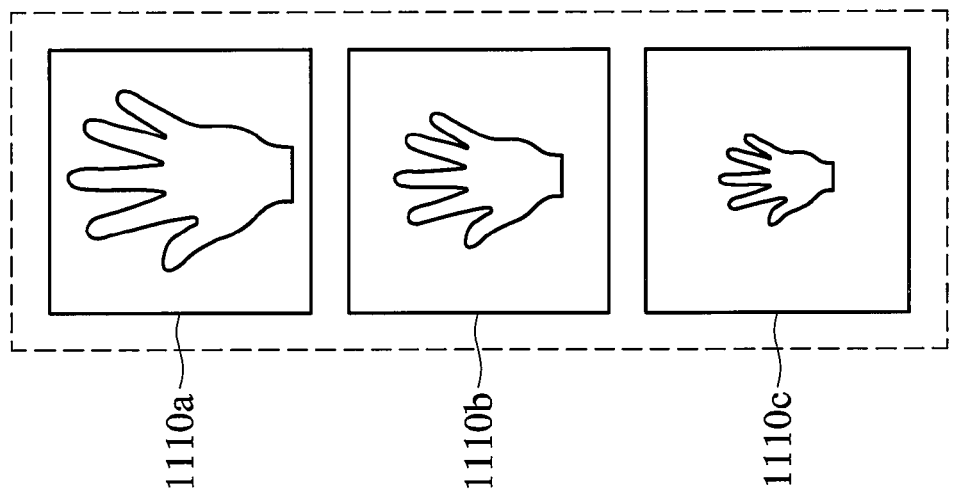

Moreover, electronic apparatuses may predefine gesture motions each mapped to a specific operation, and then, trigger one of the mapped operations according to captured images containing the predefined gestured motion by camera modules thereof. Methods for generating base images comprising gesture motions and mapping of gestured motions to operations are provided. The gestured motion may be referred to as multiple continuous gestures, for example, making a first from an opened hand position, opening a hand from a first position. FIG. 10 is a flowchart illustrating an embodiment of a method for generating base images. To begin, raw images containing gestures via an embedded camera module (e.g. 110 of FIG. 1A or 1B) are captured (step S1011). A user may hold the electronic device to set the embedded camera module to focus on his/her hand, and press a shutter button disposed on a surface thereof for a period of time, to capture multiple raw images of gestures. Referring to FIGS. 11A and 11B, in order to improve comparative accuracy, the camera module may capture multiple raw images with different focal lengths, such as multiple raw images 1110a to 1110c and 1130a to 1130c. In some embodiments, two of the captured images are selected, wherein one represents the start of a gestured motion and the other represents the end of the gestured motion (step S1013). For example, when determining a first gestured motion from an open hand position, image 1110a indicates the start of the gestured motion and image 1130a indicates the end of the gestured motion via an MMI. When determining an opened hand gestured motion from a first position, image 1130a indicates the start of the gestured motion and image 1110a indicates the end of the gestured motion via an MMI. Next, base images for the selected images are generated (step S1015). The captured raw images may be treated as base images, or the base images are generated by further processing the captured raw image. For example, the captured raw images may be reduced to relatively smaller-sized images, for example, from 1024×768 to 640×480 pixels, in order to reduce the storage space. In another example, only Y or G components of the captured raw images are acquired to generate base images, in order to reduce the storage space and improve comparative efficiency. Subsequently, relative information is provided to indicate which captured raw images correspond to start and ending gestures, and which pair of start and ending gestures is mapped to which specific operation (step S1017). For example, images 1110a and 1130a of FIGS. 11A and 11B indicate a pair of ending gesture and start gesture, and this pair is mapped to acceptance of a request. The relative information may be determined and set by a user via an MMI. The selected images with relative information are stored in a non-volatile memory/storage device (e.g. 251 of FIG. 2) (step S1019). It is to be understood that step S1015 may be revised to determine regions of human flesh colors from base images and generate a feature vector for each determined region of human flesh colors using the predefined discrimination function. In addition, step S1017 may be revised to provide relative information indicating that a pair, comprising a start and an ending gesture, is mapped to a specific operation, and the start and the ending gesture corresponds to a feature vector, as well as, step S1019 may be modified to store the generated feature vectors with the provided relative information.

The flowchart illustrated in FIG. 5, 9 or 10 can be considered as a configuration method, facilitating users to define proprietary relationships between specific functions/operations and base images, feature vectors of images, directions of movement or gestured motions.

Figure 12:
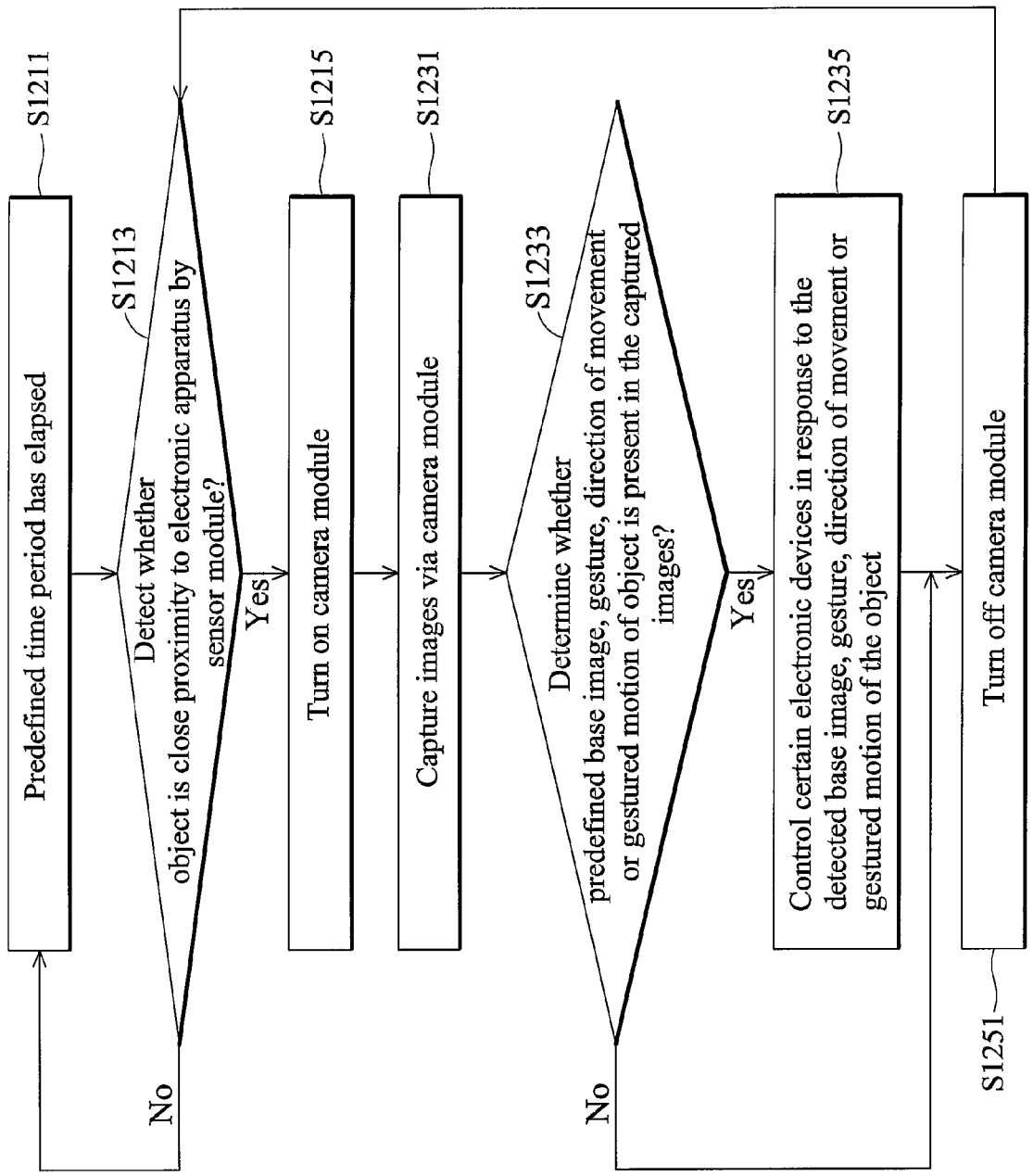
FIG. 12 is a flowchart illustrating an embodiment of a method for controlling electronic devices according to signals from a digital camera module and a sensor module.

FIG. 12 is a flowchart illustrating an embodiment of a method for controlling electronic devices according to signals from a digital camera and sensor modules, performed by a processor (e.g. 211 of FIG. 2) executing program codes. In order to avoid unnecessary power consumption, the embodiment of the method is performed to periodically detect the existence of an object, such as a hand, a pen or others, which may be in close proximity to an electronic apparatus (e.g. 100 of FIG. 2), by a sensor module thereof (e.g. 233 of FIG. 2), wherein a predefined time period is determined according to application requirements (steps S1211 and S1213). The sensor module may be a light sensor (e.g. 150 of FIG. 1C), a capacitive sensor (e.g. 170 of FIG. 1C) or others. When an object in close proximity to the electronic apparatus is detected, as the examples shown in FIG. 1A or 1B, certain steps of steps S1215 to S1251 are performed to detect existence of a particular instruction from images captured by a camera module (e.g. 110 of FIG. 1A or 1B) and accordingly control various electronic devices of the electronic apparatus (e.g. 251, 253, 271, 273, 275, 277 or any combination of the above of FIG. 2).

One RGB/YCbCr bitmap image or a series of RGB/YCbCr bitmap images are captured via the camera module (step S1231) after the camera module is turned on (step S1215), wherein the camera module may contain lenses (not shown), shutters (not shown), driving motors (not shown) and a digital image processing module (e.g. 231 of FIG. 2). It is to be understood that the camera module may capture the images in less than 15 images per second instead of 30 images per second or more to reduce power consumption. Then, it is determined whether a predefined image, gesture, direction of movement or gestured motion of the object is present in the captured images (step S1233). If so, certain electronic devices (e.g. 251, 253, 271, 273, 275, 277, or any combinations thereof of FIG. 2) are controlled in response to the determined base image, gesture, direction of movement or gestured motion of the object according to the stored association information (step S1235) and the camera module is subsequently turned off (step S1251). Otherwise, the camera module is turned off (step S1251). Details of exemplary association information may refer to descriptions of steps S515 of FIG. 5, S915 of FIG. 9 or S1017 of FIG. 10.

Detailed description of step S1233 is further described in the following. In an example, with a set of base images (e.g. 610a to 610c or 630a to 630c of FIG. 6) stored in a non-volatile memory/storage device (e.g. 251 of FIG. 2), a similarity comparison algorithm is employed to calculate the extent of the similarity between each base image and each acquired image. When the extent of the similarity between the base image and one acquired image is greater than a predefined threshold it is determined that the base image exists. Otherwise, it is determined that no base image exists.

In another example, with discrimination functions corresponding to gestures (e.g. 850 and 870 of FIGS. 8C and 8D) stored in a non-volatile memory/storage device (e.g. 251 of FIG. 2), regions of human flesh colors are determined from the captured images, a predefined feature extraction procedure is employed to calculate a feature vector for each determined region, such as containing characteristics derived from lengths $L_1$ to $L_5$ as shown in FIG. 8C or 8D, and subsequently the previously provided discrimination functions are employed to determine the similarity extent of each generated feature vector, where the discrimination function may refer to the above descriptions of steps S513 and S515. For each generated feature vector, when the maximum of similarity extents calculated by the discrimination functions is greater than a predefined threshold, it is determined that one predefined gesture is present. Otherwise, it is determined that no predefined gesture is present.

In still another example, with information regarding predefined direction of movement (e.g. moving leftward, rightward, upward, downward, upper-leftward, upper-rightward, lower-leftward or lower-rightward or other directions) stored in a non-volatile memory/storage device (e.g. 251 of FIG. 2), a video encoder (e.g. 370 of FIG. 3) may be employed to calculate motion vectors for the captured images, and a direction of movement based on the generated motion vectors may be generated. Exemplary generation of the direction of movement may refer to the descriptions of step S913 of FIG. 9. When the generated direction of movement is present in the stored information, it is determined that one predefined direction of movement is present, and when the generated direction of movement is not present in the stored information, it is determined that no predefined direction of movement is present.

Figure 13:
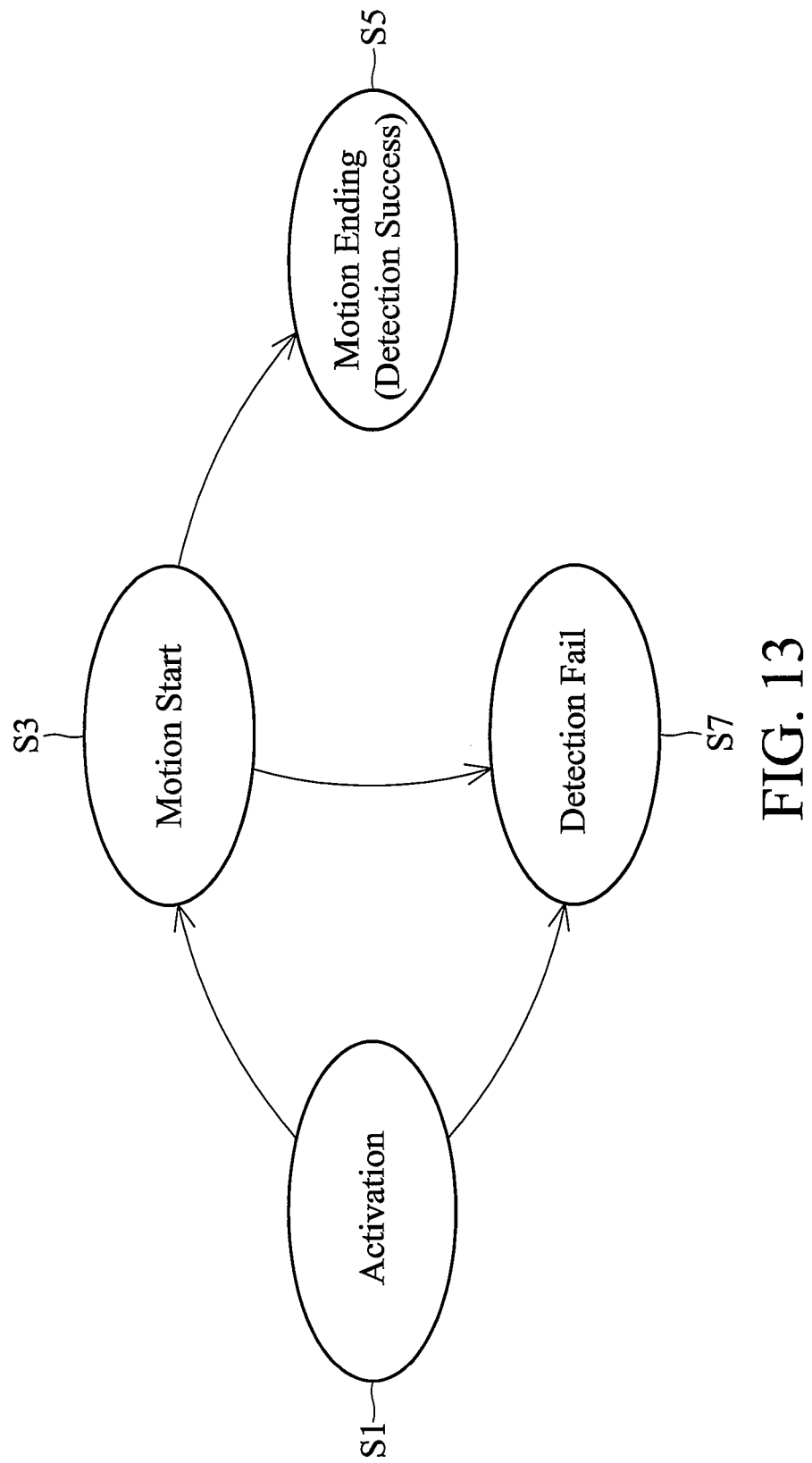
FIG. 13 is a diagram illustrating a finite state machine employed to determine existence of a predefined gesture motion.

In still another example, with discrimination functions corresponding to a start and an ending gesture (e.g. 1110a to 1110c of FIG. 11A, and 1130a to 1130c of FIG. 11B) stored in a non-volatile memory/storage device (e.g. 251 of FIG. 2), a finite state machine (FSM), with shown in FIG. 13, may be employed to determine existence of a predefined gesture motion. After capturing images via a camera module shown in step S1231 of FIG. 12 during a predefined time period, an activation state S1 is entered. In the activation state S1, regions of human flesh colors are determined from a portion of the captured images, a predefined feature extraction procedure is employed to calculate a feature vector for each determined region, such as containing characteristics derived from lengths $L_1$ to $L_5$ as shown in FIG. 8C or 8D, and the discrimination functions are employed to determine the extent of the similarity between each generated feature vector and the start gesture, where the discrimination function may refer to the above descriptions of steps S513 and S515. When the maximum of similarity extents is greater than a predefined threshold, transition is made from the activation state S1 to a motion start state S3. Contrarily, when the maximum of similarity extents is not greater than a predefined threshold, transition is made from the activation state S1 to a detection fail state S7. In the motion start state S3, regions of human flesh colors are determined from remaining captured images, the same feature extraction procedure is employed to calculate a feature vector for each determined region, such as containing characteristics derived from lengths $L_1$ to $L_5$ as shown in FIG. 8C or 8D, and the same discrimination functions are employed to determine the similarity extent with an ending gesture. When the maximum of similarity extents is greater than a predefined threshold, transition is made from the motion start state S3 to a motion ending state S5 (also referred to as a detection success state). When the maximum of similarity extents is not greater than the predefined threshold, transition is made from the motion start state S3 to the detection fail state S7. Note that when a predefined gestured motion is determined, the motion ending state S5 is entered, and when a predefined gestured motion is not determined, the detection fail state S7 is entered.

Figure 14A:
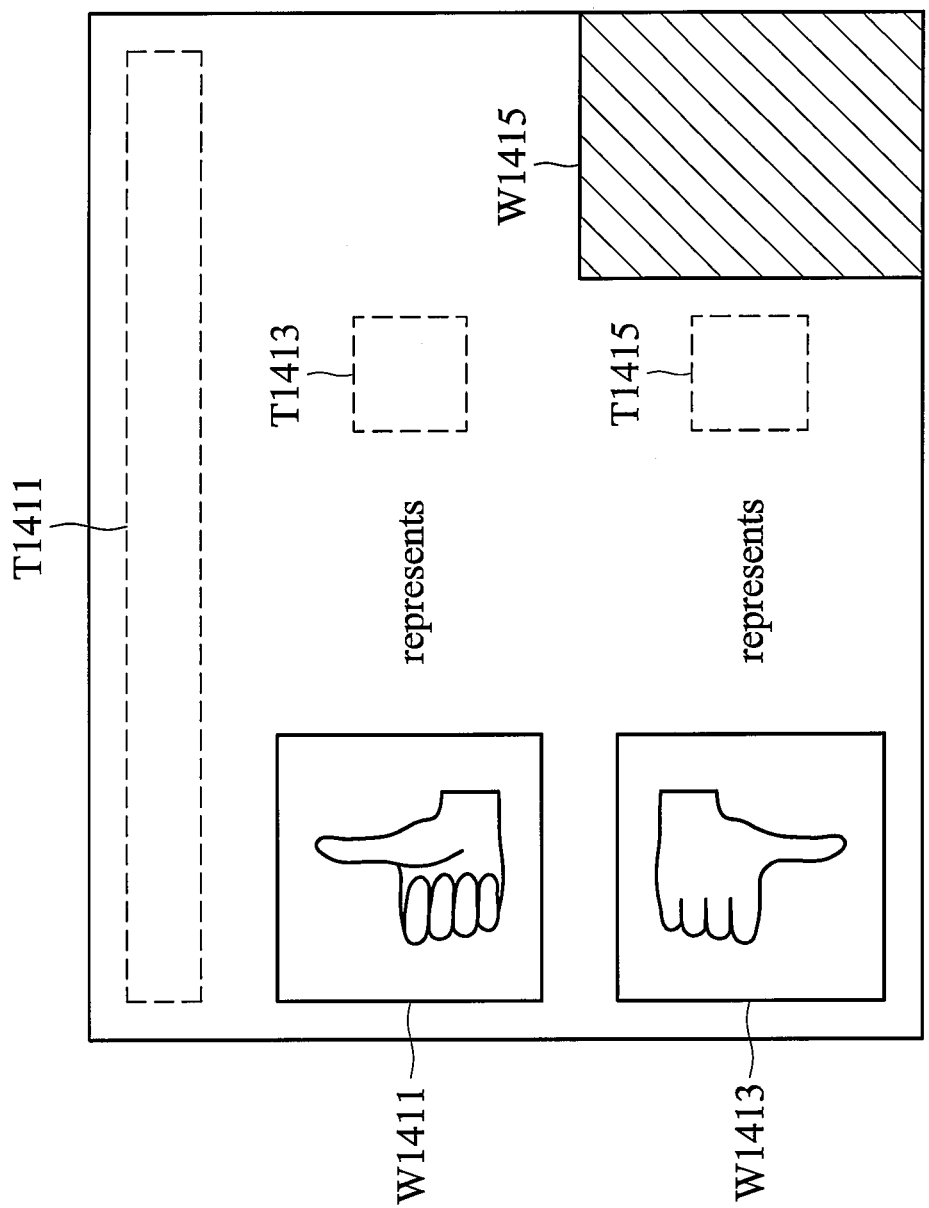
FIGS. 14A, 14B and 14C are diagrams showing exemplary prompt screens.
Figure 14B:
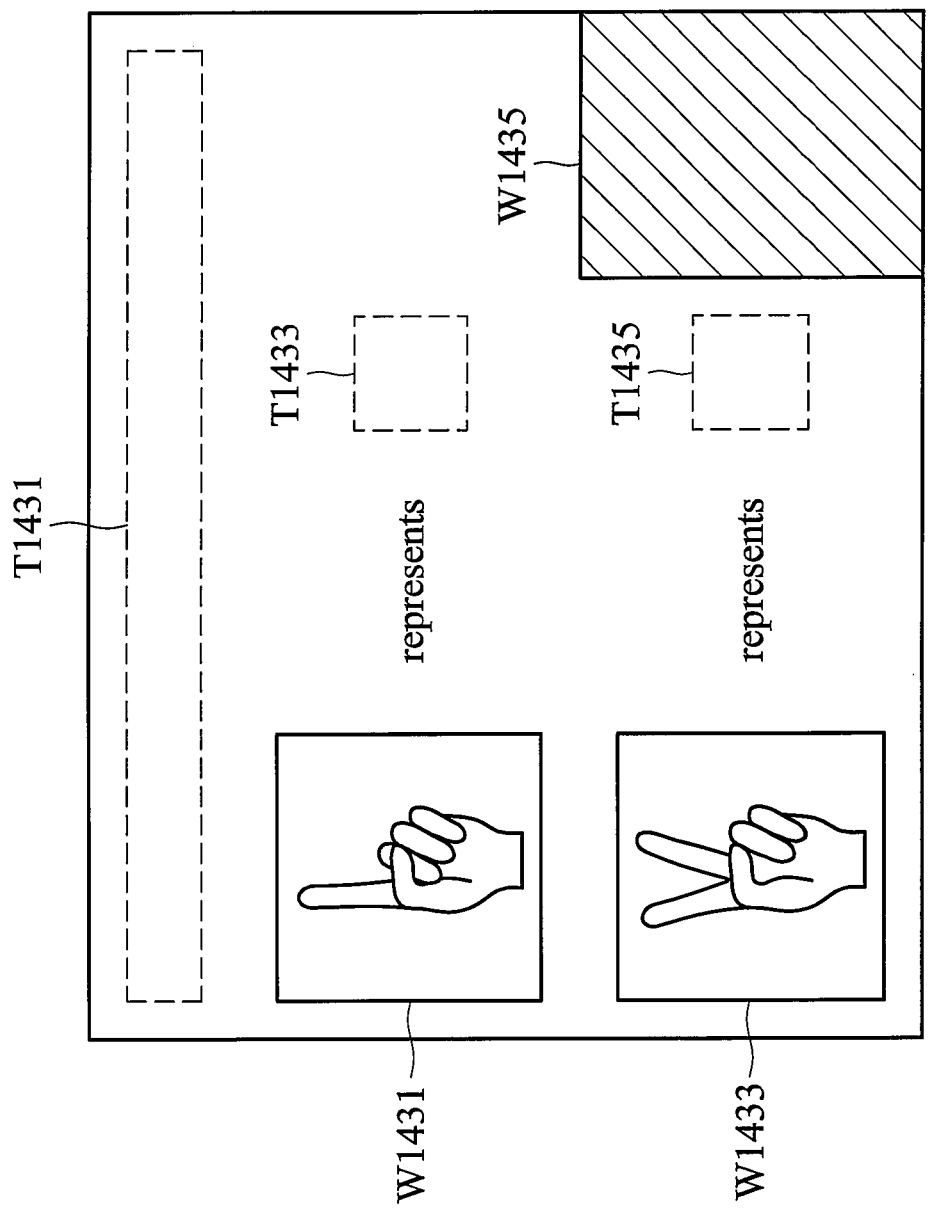
Figure 14C:
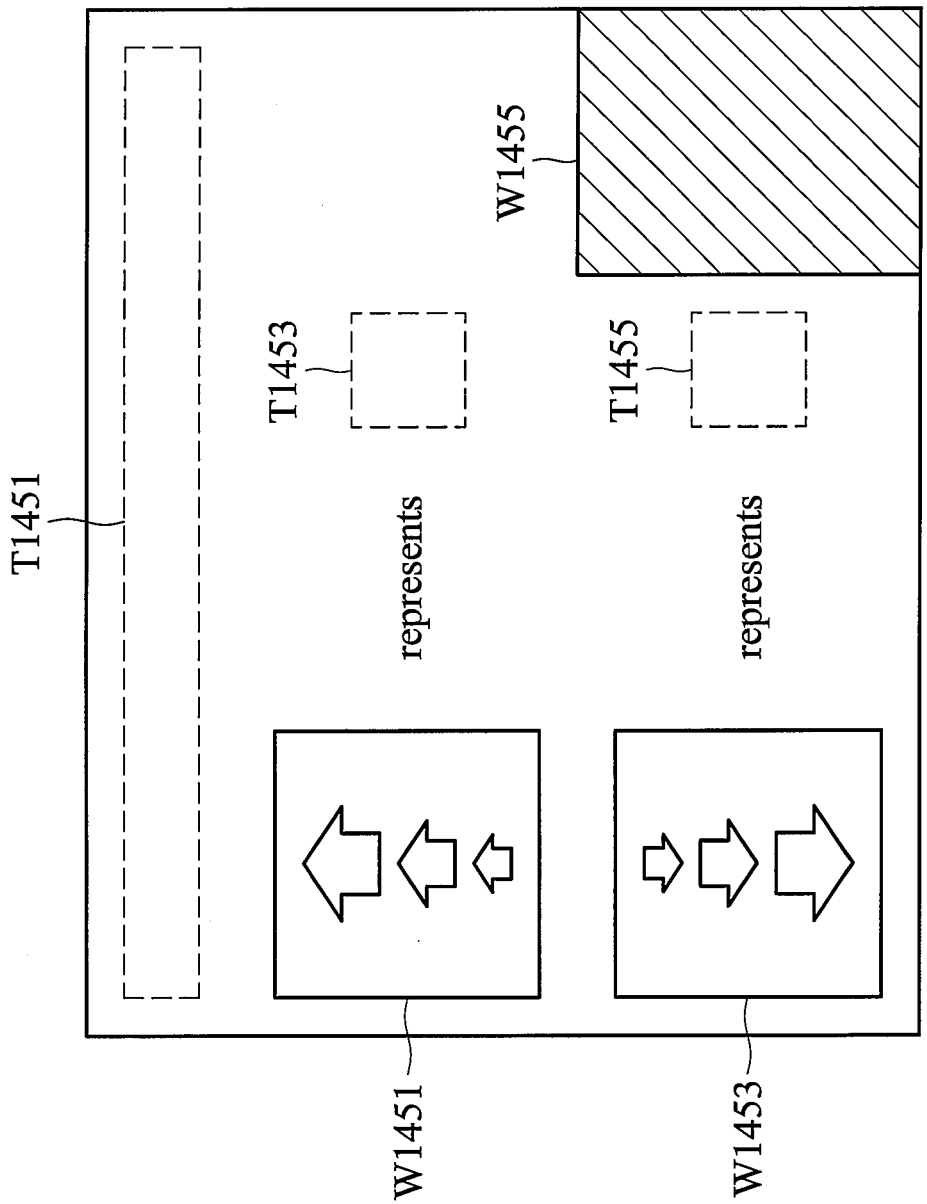

An application is described to employ the embodiment of the method shown in FIG. 12 for controlling a telecommunication module (e.g. 277 of FIG. 2) to make a mobile-originated (MO) call request with the last dialed number or a default number through a camped-on cell. After detecting that an object is close proximity to the electronic apparatus by a sensor module (e.g. 233 of FIG. 2 and step S1213 of FIG. 12), a camera module (e.g. 110 of FIG. 1A or 1B) is turned on (e.g. step S1215 of FIG. 12) and a series of images are captured by the camera module (e.g. step S1231 of FIG. 12). During image capturing, a display unit of the electronic apparatus (not shown) may display a prompt screen shown in FIG. 14A, 14B or 14C to instruct a user to confirm whether to dial the last number by a hand gesture. The prompt fields T1411, T1431 or T1451 may show "Do you want to make an outgoing call for a last dialed number", the prompt fields T1413, T1433 or T1453 may show "YES" and the prompt fields T1415, T1435 or T1455 may show "NO". Referring to FIG. 14A, by reading the relevant text by the images displayed in windows W1411 and W1413, a user may instruct the electronic apparatus to make an MO call request to a remote electronic apparatus with the last dialed number by making a thumb-up gesture in front of the camera module, and instruct the electronic apparatus to turn off the camera module thereof by making a thumb-down gesture. Referring to FIG. 14B, by reading the relevant text by the images displayed in windows W1431 and W1433, a user may instruct the electronic apparatus to make an MO call request to a remote electronic apparatus with the last dial number by making a gesture indicating number one in front of the camera module, and instruct the electronic apparatus to turn off the camera module thereof by making a gesture indicating number two. Referring to FIG. 14C, by reading the relevant text by the images displayed in windows W1451 and W1453, a user may instruct the electronic apparatus to make an MO call request to a remote electronic apparatus with the last dial number by moving an object upward in front of the camera module, and instruct the electronic apparatus to turn off the camera module thereof by moving an object downward. Moreover, a preview window W1415, W1435 or W1455 continuously displays images captured by the camera module to help a user to make a correct gesture or move an object in a correct direction. After detecting a thumb-up gesture, a gesture indicating number one or an object moving upward from the captured images (e.g. step S1233 of FIG. 12), a telecommunication module (e.g. 277 of FIG. 2) is controlled to make an MO call request to a remote electronic apparatus with the last dialed number or the default number (e.g. step S1235 of FIG. 12) and the camera module is turned off (e.g. step S1251 of FIG. 12). After detecting a thumb-down gesture, a gesture indicating number two or an object moving downward from the captured images, the telecommunication module is not directed to make any MO call (e.g. step S1235 of FIG. 12) and the camera module is turned off (e.g. step S1251 of FIG. 12). In addition, when the sensor does not detect thumb-up or thumb-down gesture, gestures indicating number one or two, or objects moving upward or downward from the captured images for a predetermined period of time, the camera module is turned off (e.g. step S1251 of FIG. 12).

Figure 1E:
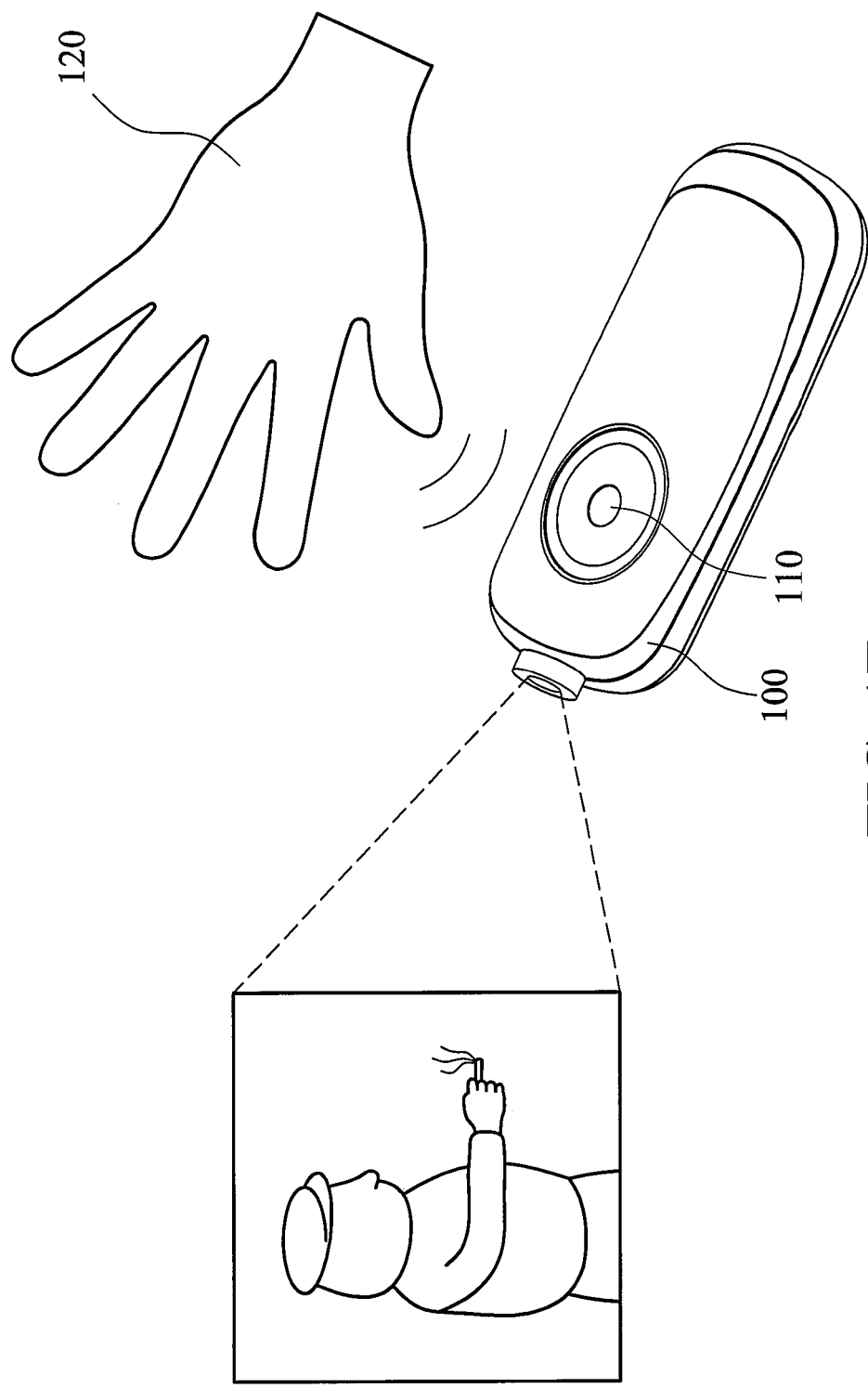

An application is described, shown in FIG. 12, to employ the embodiment of the method for controlling a still image display at a higher or lower rate for slide show, when the mobile phone 100 is placed in a particular position and is used as a portable projector to show a series of images, as shown in FIG. 1E. Reference may be made for object detection, camera module manipulation and image acquisition to the above steps S1211 to S1231 description, and thus are briefly describe herein for brevity. During image capturing, with shown in S1231, a display unit of the electronic apparatus (not shown) may display a prompt screen to instruct a user to increase or decrease the image display rate for slide show. The prompt fields T1411, T1431 or T1451 may show "Do you want to increase or decrease display rate for slide show", the prompt fields T1413, T1433 or T1453 may show "Increasing" and the prompt fields T1415, T1435 or T1455 may show "Decreasing". Referring to FIG. 14A, by reading the relevant text by the images displayed in windows W1411 and W1413, a user may instruct the electronic apparatus to display still images at a higher rate for slide show by making a thumb-up gesture in front of the camera module (for example, from 4 seconds per image to 3 seconds per image) and to display still images at a lower rate for slide show by making a thumb-down gesture. Referring to FIG. 14B, by reading the relevant text by the images displayed in windows W1431 and W1433, a user may instruct the electronic apparatus to display still images at a higher rate for slide show by making a gesture indicating number one in front of the camera module, and instruct the electronic apparatus to display still images at a lower rate for slide show by making a gesture indicating number two. Referring to FIG. 14C, by reading the relevant text by the images displayed in windows W1451 and W1453, a user may instruct the electronic apparatus to display still images at a higher rate for slide show by moving an object upward in front of the camera module, and instruct the electronic apparatus to display still images at a lower rate for slide show by moving an object downward. After detecting a thumb-up gesture, a gesture indicating number one or an object moving upward from the captured images (e.g. step S1233 of FIG. 12), a processor (e.g. 211 of FIG. 2) acquires still images from a non-volatile memory/storage device (e.g. 251 of FIG. 2) and outputs the acquired images to a projector module (e.g. 271 of FIG. 2) with a higher rate for slide show (e.g. step S1235 of FIG. 12) and the camera module is turned off (e.g. step S1251 of FIG. 12). After detecting a thumb-down gesture, a gesture indicating number two or an object moving downward from the captured images, the processor acquires still images from the non-volatile memory/storage device and outputs the acquired images to a projector module (e.g. 271 of FIG. 2) with a lower rate for slide show (e.g. step S1235 of FIG. 12) and the camera module is turned off (e.g. step S1251 of FIG. 12). In addition, when detecting no valid instruction such as thumb-up or thumb-down gestures, gestures indicating number one or two, or objects moving upward or downward has been detected from the captured images for a predetermined period of time, the camera module is turned off (e.g. step S1251 of FIG. 12). In some other embodiments, these instructions are used to control the projectile to display a subsequent still image or a previous still image.

An application is described, shown in FIG. 12, to employ the embodiment of the method for selecting the prior or the next digital TV program to play, when the mobile phone 100 is placed in a particular position and is used as a portable projector to play a digital TV program, as shown in FIG. 1E. Reference may be made for object detection, camera module manipulation and image acquisition to the above steps S1211 to S1231 description, and thus are briefly describe herein for brevity. During image capturing as shown in S1231, a display unit of the electronic apparatus (not shown) may display a prompt screen to instruct a user to select the prior or the next digital TV program for display. The prompt fields T1411, T1431 or T1451 may show "Do you want to select the prior or the next TV program", the prompt fields T1413, T1433 or T1453 may show "prior" and the prompt fields T1415, T1435 or T1455 may show "next". Referring to FIG. 14A, by reading the relevant text by the images displayed in windows W1411 and W1413, a user may instruct the electronic apparatus to select the prior TV program by making a thumb-up gesture in front of the camera module and instruct the electronic apparatus to select the next TV program by making a thumb-down gesture. Referring to FIG. 14B, by reading the relevant text by the images displayed in windows W1431 and W1433, a user may instruct the electronic apparatus to select the prior TV program by making a gesture indicating number one in front of the camera module, and instruct the electronic apparatus to select the next TV program by making a gesture indicating number two. Referring to FIG. 14C, by reading the relevant text by the images displayed in windows W1451 and W1453, a user may instruct the electronic apparatus to select the prior TV program by moving an object upward in front of the camera module, and instruct the electronic apparatus to select the next TV program by moving an object downward. After detecting a thumb-up gesture, a gesture indicating number one or an object moving upward from the captured images (e.g. step S1233 of FIG. 12), a digital TV receiving module (e.g. 279 of FIG. 2) is directed to acquire video, audio and data streams of the prior TV program from a DVB-T or a DVB-H source provider, decode and output the acquired video and data streams to a projector module (e.g. 271 of FIG. 2), and decode and output the acquired audio stream to a sound playing module (e.g. 273 of FIG. 2), and the camera module is turned off (e.g. step S1251 of FIG. 12). After detecting a thumb-down gesture, a gesture indicating number two or an object moving downward from the captured images, the digital TV receiving module is directed to acquire video, audio and data streams of the next TV program from a DVB-T or a DVB-H source provider, decode and output the acquired video and data streams to the projector module, and decode and output the acquired audio stream to the sound playing module, and the camera module is turned off (e.g. step S1251 of FIG. 12). In addition, when detecting no valid instructions such as thumb-up or thumb-down gestures, gestures indicating number one or two, or objects moving upward or downward is detected from the captured images for a predetermined period of time, the camera module is turned off (e.g. step S1251 of FIG. 12).

Figure 15:
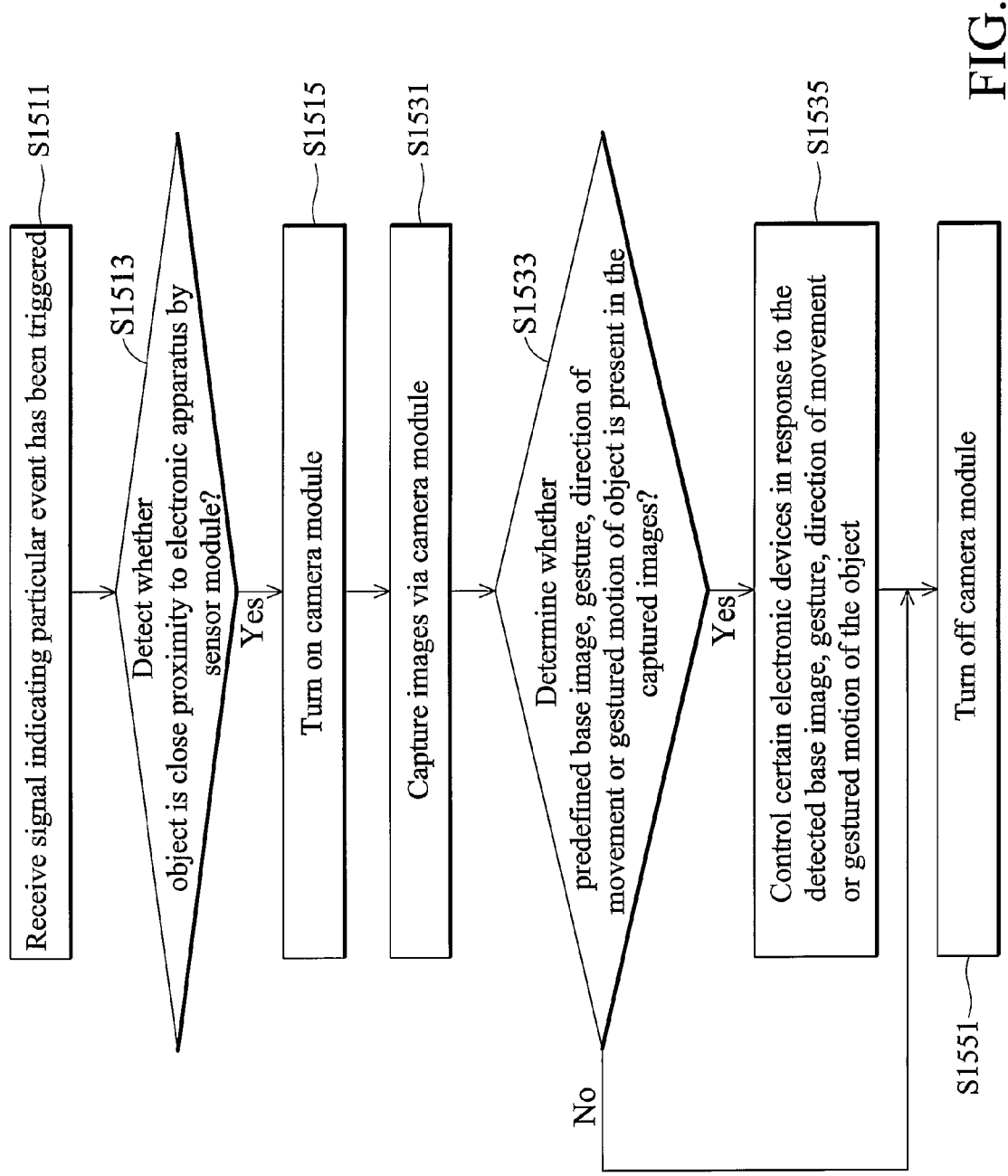
FIG. 15 is a flowchart illustrating an embodiment of a method for controlling electronic devices according to signals from a digital camera module and a sensor module.

FIG. 15 is a flowchart illustrating an embodiment of a method for controlling electronic devices according to signals from a digital camera module and a sensor module, performed by a processor (e.g. 211 of FIG. 2) executing program codes. The embodiment of the method starts by determining whether an object, such as a hand, a pen or others, is close proximity to an electronic apparatus (e.g. 100 of FIG. 2) by a sensor module thereof (e.g. 233 of FIG. 2) after a signal indicating that a particular event has been triggered is received (step S511). Reference can be made to steps S1213 to S1251 of FIG. 12 for detailed description of subsequent steps 1511 to 1551.

An application is described, employing the embodiment of the method shown in FIG. 15 for controlling a telecommunication module (e.g. 277 of FIG. 2) whether to answer a mobile-terminated (MT) call request from a camped-on cell. After receiving a signal indicating that an MT call request is received (e.g. step S1511 of FIG. 15) and detecting that an object is close proximity to the electronic apparatus by a sensor module (e.g. 233 of FIG. 2 and step S1513 of FIG. 15), a camera module (e.g. 110 of FIG. 1A or 1B) is turned on (e.g. step S1515 of FIG. 15) and a series of images are captured by the camera module (e.g. step S1531 of FIG. 15). During image capturing, a display unit of the electronic apparatus (not shown) may display a prompt screen shown in FIG. 14A, 14B or 14C to instruct a user to confirm whether to answer the MT call request by hand gesture. The prompt fields T1411, T1431 or T1451 may show "Do you want to answer an incoming call", the prompt fields T1413, T1433 or T1453 may show "YES" and the prompt fields T1415, T1435 or T1455 may show "NO". Referring to FIG. 14A, by reading the relative text by the images displayed in the windows W1411 and W1413, a user may instruct the electronic apparatus to answer the MT call request from a remote electronic apparatus by making a thumb-up gesture in front of the camera module, and instruct the electronic apparatus to turn off the camera module thereof by making a thumb-down gesture. Referring to FIG. 14B, by reading the relative text by the images displayed in the windows W1431 and W1433, a user may instruct the electronic apparatus to answer the MT call request from a remote electronic apparatus by making a gesture indicating number one in front of the camera module, and instruct the electronic apparatus to turn off the camera module thereof by making a gesture indicating number two. Referring to FIG. 14C, by reading the relevant text by the images displayed in windows W1451 and W1453, a user may instruct the electronic apparatus to answer the MT call request from a remote electronic apparatus by moving an object upward in front of the camera module, and instruct the electronic device to turn off the camera module thereof by moving an object downward. Moreover, a preview window W1415, W1435 or W1455 of FIG. 14A, 14B or 14C continuously displays images captured by the camera module to help a user to make a correct gesture or move an object in a correct direction. After detecting a thumb-up gesture, a gesture indicating number one or an object moving upward from the captured images (e.g. step S1533 of FIG. 15), a telecommunication module (e.g. 277 of FIG. 2) is controlled to accept the MT call request from a remote electronic apparatus (e.g. step S1535 of FIG. 15) and the camera module is turned off (e.g. step S1551 of FIG. 15). After detecting a thumb-down gesture, a gesture indicating number two or an object moving downward from the captured images, the telecommunication module is directed to reject the MT call request (e.g. step S1535 of FIG. 15) and the camera module is turned off (e.g. step S1551 of FIG. 15). In addition, when no valid instruction such as thumb-up or thumb down gesture, gesture indicating number one or two, or object moving upward or downward has been detected from the captured images for a predetermined period of time, the camera module is turned off (e.g. step S1551 of FIG. 15).

A mobile phone may be operated in a regular mode and a vibration mode after receiving an MT call request. When operating in the regular mode, a sound playing module (e.g. 273 of FIG. 2) is directed to buzz, play a ring tone or a predefined MP3 file until the MT call request has been answered or the MT call request is timed-out. When operating in the vibration mode, a vibration module (e.g. 275 of FIG. 2) is directed to vibrate until the MT call request has been answered or the MT call request is timed-out. An application is described to employ the embodiment of the method shown in FIG. 15 for controlling a mobile phone (e.g. 100 of FIG. 2) for switching to the vibration mode. After receiving a signal indicating that an MT call request is received (e.g. step S1511 of FIG. 15) and detecting that an object is close proximity to the electronic apparatus by a sensor module (e.g. 233 of FIG. 2 and step S1513 of FIG. 15), a camera module (e.g. 110 of FIG. 1A or 1B) is turned on (e.g. step S1515 of FIG. 15) and a series of images are captured by the camera module (e.g. step S1531 of FIG. 15). After detecting a gestured motion indicating making of a first from an opened hand, the vibration mode is switched, that is, the sound playing module is controlled to stop playing a ring tone or a predefined MP3 file, the vibration module is controlled to vibrate (e.g. step S1535 of FIG. 15) and the camera module is turned off (e.g. step S1551 of FIG. 15). In addition, when a gestured motion is not detected, the camera module is turned off (e.g. step S1551 of FIG. 15).

Methods or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, a DVD recorder or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method for contactlessly controlling an electronic apparatus, performed by a processor of the electronic apparatus, comprising:
    periodically detecting whether an object is in close proximity to the electronic apparatus when the electronic apparatus is in a fixed position;
    turning on a camera module of the electronic apparatus to capture a series of images upon detecting that the object is in close proximity to the electronic apparatus and performing a contactless control procedure while the camera module of the electronic apparatus is in use and the electronic apparatus is in the fixed position,
    wherein the contactless control procedure further comprises:
    determining a control operation in response to the captured images;
    performing the control operation to an electronic device of the electronic apparatus upon obtaining an instruction based on analyzing the captured images; and
    turning off the camera responsive to not obtaining an instruction within a predetermined time period.

2. The method as claimed in claim 1 wherein the existence of an object in close proximity to the electronic apparatus is detected by a light sensor comprising a transmitter and a receiver, the transmitter emits infrared signals, the receiver receives the infrared signals reflected by the object, and the light sensor determines the existence of an object in close proximity to the electronic apparatus when detecting a certain amount of the reflected infrared signals.

3. The method as claimed in claim 1 wherein the existence of an object in close proximity to the electronic apparatus is detected by a capacitive sensor, and the capacitive sensor determines the existence of an object in close proximity to the electronic apparatus when detecting changes in an electric field satisfy a predefined criteria.

4. The method as claimed in claim 1 further comprising:
    providing a base image related to the control operation, wherein the step of determination of the control operation further comprises:
    comparing each captured image with the base image using a similarity comparison algorithm to calculate an extent of the similarity between the base image and the captured image; and
    determining the control operation when one of the calculated extents is greater than a predefined threshold.

5. The method as claimed in claim 1 further comprising:
    providing a discrimination function related to the control operation, wherein the step of determination of the control operation further comprises:
    calculating a feature vector for each captured image using a predefined feature extraction procedure;
    carrying each feature vector in the discrimination function to calculate a similarity extent of the feature vector; and
    determining the control operation when one of the calculated extents is greater than a predefined threshold.

6. The method as claimed in claim 1 further comprising:
providing a predefined direction of movement related to the control operation, wherein the step of determination of the control operation further comprises:
analyzing a plurality of motion vectors for the captured image using a video encoder;
determining the control operation when the calculated motion vectors indicates the predefined direction of movement.

7. The method as claimed in claim 6 wherein the step of determination of the control operation further comprises: calculating an overall motion vector $(X_o, Y_o)$ by formulae $$X_o = \left(\sum_{i=1}^{n} Xi\right)/n$$

and $$Y_o = \left(\sum_{i=1}^{n} Yi\right)/n,$$

wherein n represents a total number of motion vectors, the $X_i$ represents the reference offset in the X axis of the (i)th motion vector, and $Y_i$ represents the reference offset in the Y axis of the (i)th motion vector; and determining the control operation when the calculated overall motion vector indicates the predefined direction of movement.

8. The method as claimed in claim 6 wherein the step of determination of the control operation further comprises:
classifying each motion vector into a plurality of directions of movement, wherein the classified directions comprises the provided direction of movement; counting each movement of direction according to the classification results; and determining the control operation when the count of the provided direction of movement is higher than the others and satisfies a predetermined criteria.

9. The method as claimed in claim 1 further comprising:
providing a predefined gestured motion related to the control operation, wherein the step of determination of the control operation further comprises:
determining the control operation when the captured images indicates the predefined gestured motion.

10. The method as claimed in claim 9 wherein the gestured motion comprises a start gesture and an end gesture, and the step of determination of the control operation further comprises: determining the control operation when the captured images indicates both the start and end gestures.

11. The method as claimed in claim 1 wherein the control operation comprises controlling a telecommunication module of the electronic apparatus to make an mobile-originated call request to a remote electronic apparatus with the last dialed number or a default number via a camped-on cell.

12. The method as claimed in claim 1 wherein the control operation comprises acquiring still images from a non-volatile memory or a storage device of the electronic apparatus, and outputting the acquired still images to a projector module of the electronic apparatus in a higher or a lower rate for slide show.

13. The method as claimed in claim 1 wherein the control operation comprises directing a digital TV receiving module to acquire a video or audio stream of the prior TV program or the next TV program.

14. An electronic apparatus comprising:
a processor, coupled to a camera module, a sensor module and an electronic device of the electronic apparatus, turning on the camera module to capture a series of images when the sensor module detects existence of an object in close proximity to the electronic apparatus being in a fixed position by the sensor module of the electronic apparatus, and performing a contactless control procedure while the camera module is in use and the electronic apparatus is in the fixed position, wherein the contactless control procedure further comprises:
receiving the captured images from the camera module,
determining a control operation in response to the captured images, and
performing the control operation to the electronic device upon obtaining an instruction based on analyzing the captured images, and
turning off the camera responsive to not obtaining an instruction within a predetermined time period.

15. The electronic apparatus as claimed in claim 14 further comprising a display unit, wherein the processor directs the display unit of the electronic apparatus to display a prompt screen to instruct a user to control the electronic apparatus by hand gesture when the sensor module detects existence of an object in close proximity to the electronic apparatus.

16. The method as claimed in claim 1, further comprising directing a projector module of the electronic apparatus to project multimedia data on a flat surface, wherein the step of periodical detection further comprises periodically detects whether an object is in close proximity to the electronic apparatus when the electronic apparatus is in a fixed position to project the multimedia data.

17. The electronic apparatus as claimed in claim 14 wherein the processor is coupled to a projector module of the electronic apparatus, directs the projector module to project multimedia data on a flat surface, and receives signals from the sensor module while projecting the multimedia data on a flat surface.

18. The electronic apparatus as claimed in claim 17 wherein the control operation comprises outputting a plurality of still images to the projector module in a higher or a lower rate for slide show.

19. The electronic apparatus as claimed in claim 17 wherein the control operation comprises directing a digital TV receiving module of the electronic apparatus to acquire a video or audio stream of the prior TV program or the next TV program and outputting the acquired video or audio stream to the projector module.

* * * * *